United States Patent [19]

Itagaki

[11] Patent Number: 5,240,547
[45] Date of Patent: Aug. 31, 1993

[54] METHOD OF AND APPARATUS FOR AUTOMATICALLY WRAPPING COVER MATERIAL ABOUT STEERING WHEEL

[75] Inventor: Toshio Itagaki, Souka, Japan

[73] Assignee: Midori Anzen Kogyo Co., Ltd., Japan

[21] Appl. No.: 750,560

[22] Filed: Aug. 27, 1991

[30] Foreign Application Priority Data

| Sep. 11, 1990 | [JP] | Japan | 2-239027 |
| Oct. 12, 1990 | [JP] | Japan | 2-272191 |
| Nov. 20, 1990 | [JP] | Japan | 2-312926 |
| Nov. 30, 1990 | [JP] | Japan | 2-330207 |
| Jun. 21, 1991 | [JP] | Japan | 3-175742 |

[51] Int. Cl.$^5$ .................... B32B 31/00; B30B 7/00
[52] U.S. Cl. .................... 156/475; 156/212; 156/477.1; 156/481
[58] Field of Search .......... 156/475, 476, 477.1, 156/481, 482, 212, 213; 74/552, 558

[56] References Cited

U.S. PATENT DOCUMENTS

| 4,174,988 | 11/1979 | Moore et al. | 156/475 X |
| 4,539,065 | 9/1985 | Schmitt | 156/475 |
| 4,704,182 | 11/1987 | Sigerist | 156/475 |
| 4,704,183 | 11/1987 | Sigerist | 156/475 |

*Primary Examiner*—David A. Simmons
*Assistant Examiner*—James J. Engel, Jr.
*Attorney, Agent, or Firm*—Marger, Johnson, McCollom & Stolowitz

[57] ABSTRACT

In an apparatus for automatically wrapping a cover material about a steering wheel of a vehicle, a support arrangement is provided for supporting the steering wheel covered with the cover material, in a first plane extending perpendicularly to an axis of the steering wheel. A clamp arrangement clamps an annular strip body of the cover material to an outer peripheral section of the steering wheel supported by the support arrangement. A wiper arrangement urges one of a pair of side skirts extending respectively from side edges of the annular strip body, against an inner peripheral section of the steering wheel. In a method, the steering wheel is covered with the cover material such that free edges of the side skirts can be abutted against each other at the inner peripheral section of the steering wheel. One of the pair of side skirts is adhered to the steering wheel while the one side skirt of the cover material is wrapped about the steering wheel from the free edge of the one side skirt to a location adjacent to the recesses. An urging tool having an urging surface following a concave surface of each of the recesses in the steering wheel is used to urge each of non-adhering portions of the other side skirt of the cover material against a corresponding one of the recesses along an urging direction, thereby adhering the non-adhering portion to the recess.

31 Claims, 31 Drawing Sheets

METHOD OF AND APPARATUS FOR AUTOMATICALLY WRAPPING COVER MATERIAL ABOUT STEERING WHEEL

BACKGROUND OF THE INVENTION

The present invention relates to a method of and an apparatus for automatically wrapping a cover material about a steering wheel of a vehicle such as an automobile car, a motorboat or the like.

Referring first to FIG. 34 of the attached drawings, there is shown a conventional steering wheel 1 for a vehicle. The steering wheel 1 has an axis 2 and has an outer peripheral section 3 and an inner peripheral section 4 in a plane extending perpendicularly to the axis 2 of the steering wheel 1. The steering wheel 1 has also a pair of side surfaces 5 and 6 by which the inner and outer peripheral sections 3 and 4 are connected to each other. The steering wheel 1 has a plurality of spokes 8 generally extending radially from the inner peripheral section 4 toward the axis 2.

It is to be noted that, although the steering wheel 1 illustrated in FIG. 34 has a circular cross-sectional configuration in a plane including the axis 2 of the steering wheel 1, the steering wheel may have a rectangular or polygonal cross-sectional configuration. It is further to be noted that, although the steering wheel 1 illustrated in FIG. 34 is substantially circular in the plane extending perpendicularly to the axis 2 of the steering wheel 1, and is continuous, the steering wheel may be annular or arcuate in the plane extending perpendicularly to the axis 2 of the steering wheel 1 and may be divided into two or ore sections.

Apart from the above, there is a case where a conventional steering wheel is wrapped by a cover material such as natural leather, synthetic leather or cloth. In the steering wheel, there are many cases where a cover material previously cut into a dimension capable of being wrapped about the steering wheel from an outer periphery thereof toward an inner periphery thereof is wrapped about the steering wheel in intimate or close contact therewith, and both lateral side edges of the cover material are sewn to each other while both the side edges of the cover material are abutted against each other at the inner peripheral section of the steering wheel.

There is also the following conventional cover material 10 as illustrated in FIG. 35 which is a developed view of the cover material. That is, the cover material 10 has an annular strip body 11 and a pair of side skirts 12 and 13 extending radially inwardly respectively from both lateral side edges of the annular strip body 11. Each of the pair of skirts 12 and 13 has a plurality of lugs 14 which converge on the axis 2 of the steering wheel 1 from appropriate locations on the inner peripheral section 4 thereof. That is, the lugs 14 extend radially inwardly from the radially inward edges of the respective inner and outer peripheral sections 12 and 13 for being wrapped respectively about the spokes 8 of the steering wheel 1.

The conventional cover material has the following disadvantages. That is, operation in which the cover material is wrapped about and adhered to, or is sewn to the steering wheel has been practiced manually, or has relied upon operator's hands. Accordingly, working performance or efficiency is low or is deteriorated. In order to make finish of wrapping superior, skill in required. The cost for manufacturing the steering wheel covered with the cover material increases correspondingly.

Further, as shown in FIG. 36, in the conventional steering wheel 1, the following wrapping method has been utilized. That is, the steering wheel 1 is covered with the cover material 10 through the adhesives. The entire cover material 10 is wrapped about and adhered to the steering wheel 1 while both the side skirts 12 and 13 of the cover material 10 are stretched toward the inner peripheral section 4 of the steering wheel 1. Both side edges of the respective side skirts 12 and 13 of the cover material 10 are abutted against each other on a center line of the inner peripheral section 4 of the steering wheel 1 as shown in FIG. 37.

In the above-described conventional wrapping method, a plurality of recesses 7 are formed in a peripheral portion along the outer peripheral section 3 of the steering wheel 1. A pair of hands of an operator have fingers which can be applied to the recesses 7. Thus, the following disadvantages arise. That is, in the case where the steering wheel 1 is covered with the cover material 10 in such a manner that both the side skirts 12 and 13 of the cover material 10 are stretched toward the inner peripheral section 4 of the steering wheel 1 while a uniform force is applied to the side skirts 12 and 13, a gap 9 occurs or is defined between each of the recesses 7 and a corresponding portion of the cover material 10, which is opposed to the recess 7. As time of use of the steering wheel 1 lapses, creases, slacking or loosening due to the recesses 7 occur in the cover material 10. Thus, a feeling of use of the steering wheel 1 is deteriorated.

It is an object of the invention to provide an apparatus for automatically wrapping a cover material about a steering wheel of a vehicle, which is capable of overcoming the aforesaid disadvantages.

It is another object of the invention to provide a method of wrapping a cover material about a steering wheel of a vehicle, which is capable of overcoming the aforesaid disadvantages.

SUMMARY OF THE INVENTION

According to the invention, there is provided an apparatus for automatically wrapping a cover material about a steering wheel of a vehicle, the steering wheel having an axis and having inner and outer peripheral sections in a first plane extending perpendicularly to the axis of the steering wheel, the steering wheel having a pair of side surfaces by which the inner and outer peripheral sections are connected to each other, the cover material having an annular strip body whose peripheral length in the first plane is substantially identical with that of the outer peripheral section of the steering wheel and a pair of side skirts extending radially inwardly respectively from both side edges of the annular strip body, the annular strip body and the pair of side skirts cooperating with each other to define therein an annular space into which the steering wheel can be fitted, the apparatus comprising:

supporting means for supporting the steering wheel covered with the cover material, in the first plane;

clamp means for clamping the annular strip body of the cover material to the outer peripheral section of the steering wheel supported by the support means; and wiper means for urging one of the pair of side skirts against the inner peripheral section of the steering wheel.

With the arrangement of the invention, the following advantages can be produced. That is, it is possible to considerably increase or raise efficiency of the operation of wrapping the cover material about the steering wheel, without skill. Further, it is possible to wrap the cover material about the steering wheel with superior finish. It is possible to reduce the manufacturing cost required for wrapping the cover material about the steering wheel.

Preferably, the above-described apparatus further comprises drive means connected to the support means for rotatably driving the same in the first plane. In this case, the clamp means clamps the cover material to the steering wheel along the entire outer peripheral section of the steering wheel.

With the above arrangement of the invention, the following advantages can be produced. That is, it is possible to considerably increase or raise efficiency of the operation of wrapping the cover material about the steering wheel, without skill. Further, since the cover material is mounted on the steering wheel while the wiper means urges the cover material against the steering wheel from the one side skirt of the cover material, without clamping the one side skirt of the cover material from both upper and lower surfaces thereof, the cover material can be prevented from being damaged. In the case where adhesives are applied to a rear surface of the cover material, an adhering force of the adhesives can be prevented from being hindered or impeded. Thus, it is possible to wrap the cover material about the steering wheel with superior finish. It is possible to reduce the manufacturing cost required for wrapping the cover material about the steering wheel.

Preferably, the arrangement may be such that the support means and the clamp means cooperate with each other to form steering-wheel setting means for supporting the steering wheel covered with the cover material, in the first plane, and for clamping the annular strip body of the cover material to the outer peripheral section of the steering wheel, the steering-wheel setting means clamping the cover material to the steering wheel along the entire outer peripheral section of the steering wheel, the steering-wheel setting means being angularly movable about the axis of the steering wheel.

wherein the apparatus further comprises drive means for rotatively driving the steering-wheel setting means about the axis of the steering wheel, and wherein the wiper means includes a plurality of wrapping units capable of being moved to a position where one of the pair of side skirts of the cover material is wrapped up to the inner peripheral section of the steering wheel and then capable of being moved to a position where the one side skirt of the cover material is urged against the inner peripheral section of the steering wheel, the wrapping units being arranged along a circle substantially identical with the steering wheel and being arranged in the first plane in spaced relation to each other.

With the above arrangement of the invention, in the case where two wrapping units are provided, only one revolution or angular movement of the steering wheel about the axis thereof enables the cover material to be wrapped about the entire steering wheel. Further, as the number of the wrapping units increases, angular movement of the steering wheel is further reduced to enable the cover material to be wrapped about the entire steering wheel. Thus, the following advantages can be produced. That is, it is possible to considerably increase or raise efficiency of the operation of wrapping the cover material about the steering wheel, without skill. Further, since the cover material is mounted on the steering wheel while the one side skirt of the cover material is urged by the wiper without the fact that the one side skirt of the cover material is clamped from upper and lower surfaces of the one side skirt. Thus, the cover material can be prevented from being damaged. In the case where the adhesives are applied to a rear surface of the cover material, an adhering force of the adhesives can be prevented from being hindered or impeded. Thus, it is possible to wrap the cover material about the steering wheel with superior finish. It is possible to reduce the manufacturing cost required for wrapping the cover material about the steering wheel.

According to the invention, there is provided a method of wrapping a cover material about a steering wheel of a vehicle, the steering wheel having an axis and having inner and outer peripheral sections in a first plane extending perpendicularly to the axis of the steering wheel, the steering wheel having a pair of side surfaces by which the inner and outer peripheral sections are connected to each other, the steering wheel further having a plurality of recesses formed in one of the side sections along the inner and outer peripheral sections, a pair of hands of an operator having fingers which can be applied to the recesses, the cover material having an annular strip body whose peripheral length in the first plane is substantially identical with that of the outer peripheral section of the steering wheel and a pair of side skirts extending radially inwardly respectively from both side edges of the annular strip body, the annular strip body and the pair of side skirts cooperating with each other to define therein an annular space into which the steering wheel can be fitted, the method comprising the steps of:

(a) covering the steering wheel with the cover material such that free edges of the pair of side skirts can be abutted against each other at the inner peripheral section of the steering wheel;

(b) adhering one of the pair of side skirts of the cover material to the steering wheel while the one side skirt of the cover material is wrapped about the steering wheel from the free edge of the one side skirt to a location adjacent to the recesses; and (c) using an urging tool having an urging surface following a concave surface of each of the recesses in the steering wheel, to urge each of non-adhering portions of the other side skirt of the cover material against a corresponding one of the recesses along an urging direction, thereby adhering the non-adhering portion to the recess.

With the above arrangement of the invention, it is possible to mount the cover material on the steering wheel without gaps occurring between the cover material and the recesses formed in the steering wheel, in such a manner that the cover material is entirely in intimate contact with the recesses. Even if time of use of the steering wheel elapses, it is possible to prevent creases, slacking or loosening from occurring in the cover material, making it possible to prevent a feeling of use of the steering wheel from being deteriorated.

DETAILED DESCRIPTION

Figure 1:
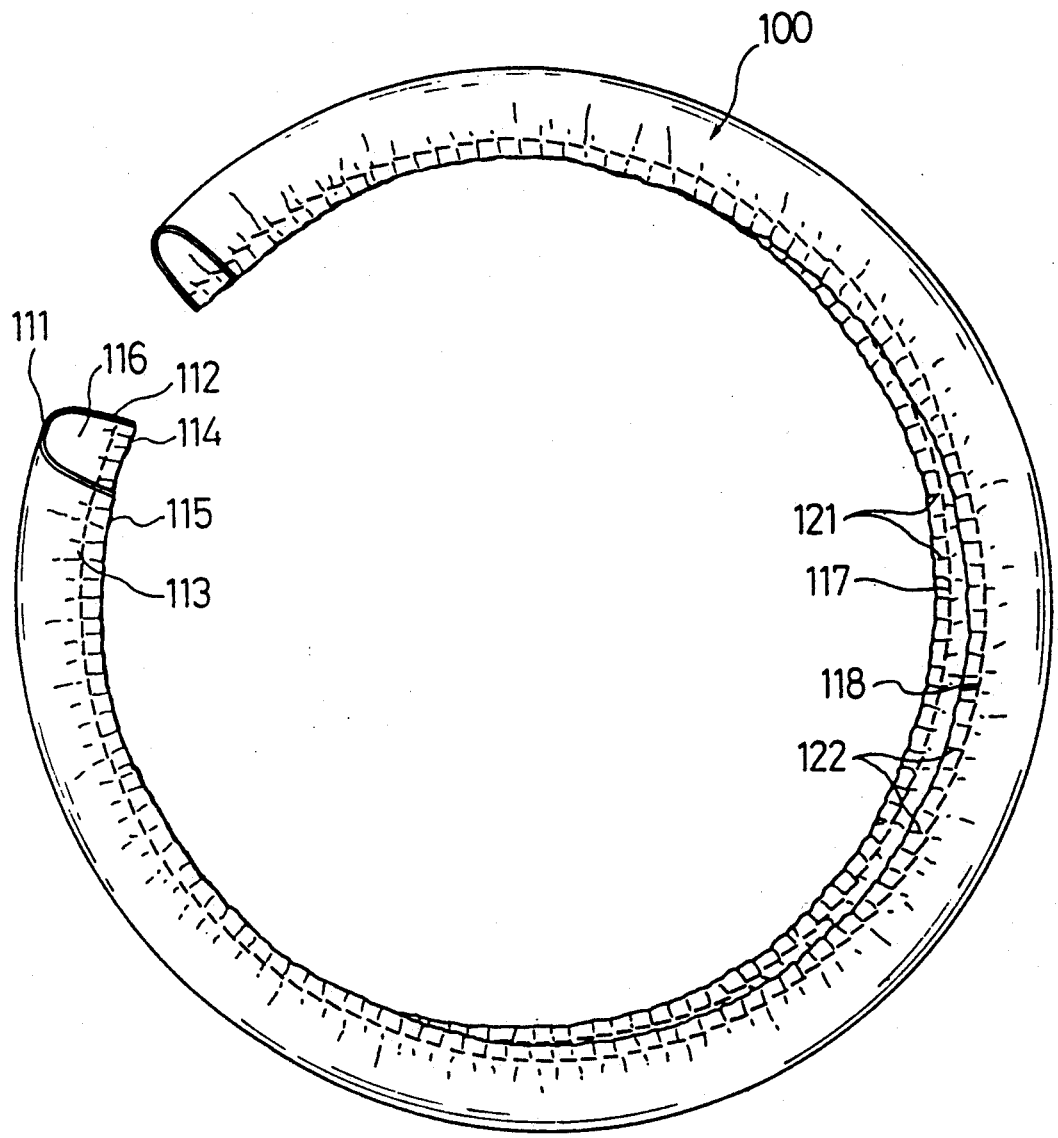
FIG. 1 is a perspective view of a cover material for a steering wheel of a vehicle.

Various embodiments of the invention will be described below with reference to the accompanying drawings. It should be noted that like or similar components and parts are designated by the same or like reference numerals through the description, and the description of the like or similar components and parts will be simplified or omitted to avoid repetition.

Figure 34:
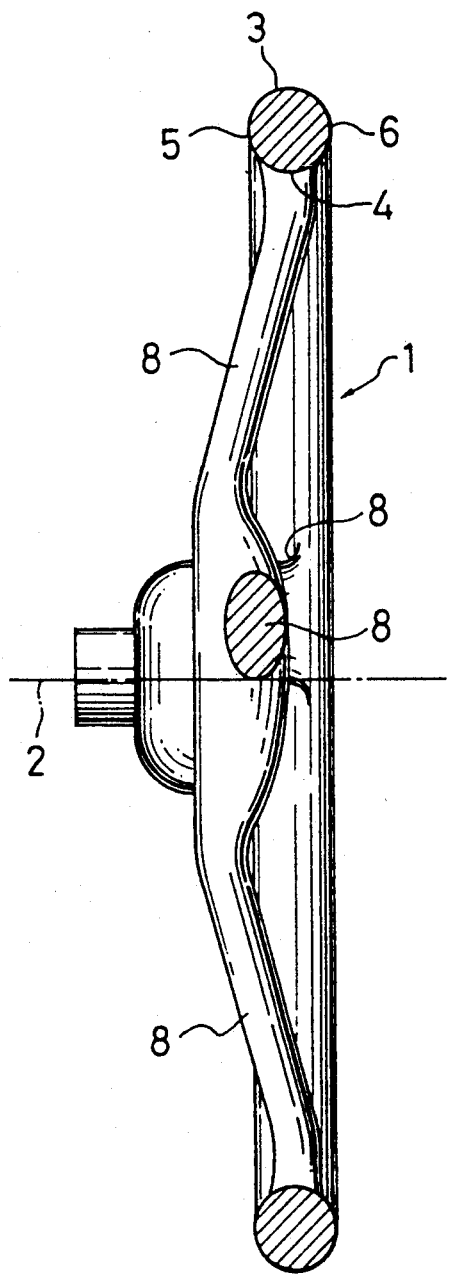
FIG. 34 is a cross-sectional view of a conventional steering wheel for a vehicle.

Referring first to FIG. 1, there is shown a cover material 100 for the steering wheel 1 illustrated in FIG. 34. The cover material 100 is disclosed in co-pending application Ser. No. 07/750,578.

The cover material 100 comprises an annular strip body 111 whose peripheral length in a plane extending perpendicularly to the axis 2 of the steering wheel 1 is substantially identical with that of the outer peripheral section 3 of the steering wheel 1, and a pair of side skirts 112 and 113 extending radially inwardly respectively from both lateral side edges of the annular strip body 111. The pair of side skirts 112 and 13 have their respective free side edges 114 and 115. The annular strip body 111 and the pair of side skirts 112 and 113 are integral with each other. The annular strip body 111 and the pair of side skirts 112 and 113 cooperate with each other to define therein an annular space 116 into which the steering wheel 1 can be fitted. The annular strip body 111 and the pair of side skirts 112 and 113 have their respective lengths in the plane including the axis 2 of the steering wheel 1, whose total is substantially identical with an outer peripheral length of the steering wheel 1 in the plane including the axis 2 of the steering wheel 1. Ruffling is applied at 117 and 118 to the pair of side skirts 112 and 113 respectively along their respective side edges 114 and 115, to form pleats 121 and 122.

First Embodiment

Referring next to FIGS. 2 through 8, there is shown an apparatus 200 for automatically wrapping the cover material 100 about the steering wheel 1. Generally, the wrapping apparatus 200 comprises a support arrangement for supporting the steering wheel 1 covered with the cover material 100, in a first plane extending perpendicularly to the axis 2 of the steering wheel 1, a clamp arrangement for clamping the annular strip body 111 of the cover material 100 to the outer peripheral section 3 of the steering wheel 1 supported by the support arrangement, a wiper arrangement for urging one of the pair of side skirts 112 and 113 against the inner peripheral section 4 of the steering wheel 1, a receiver arrangement movable in a second plane including the axis 2 of the steering wheel 1 for receiving the side skirt, and a pincher arrangement movable in the second plane and cooperating with the receiver arrangement to clamp therebetween the one side skirt. The pincher arrangement is movable together with the receiver arrangement to a position where the one side skirt is wrapped up in the inner peripheral section 4 of the steering wheel 2.

Figure 4:
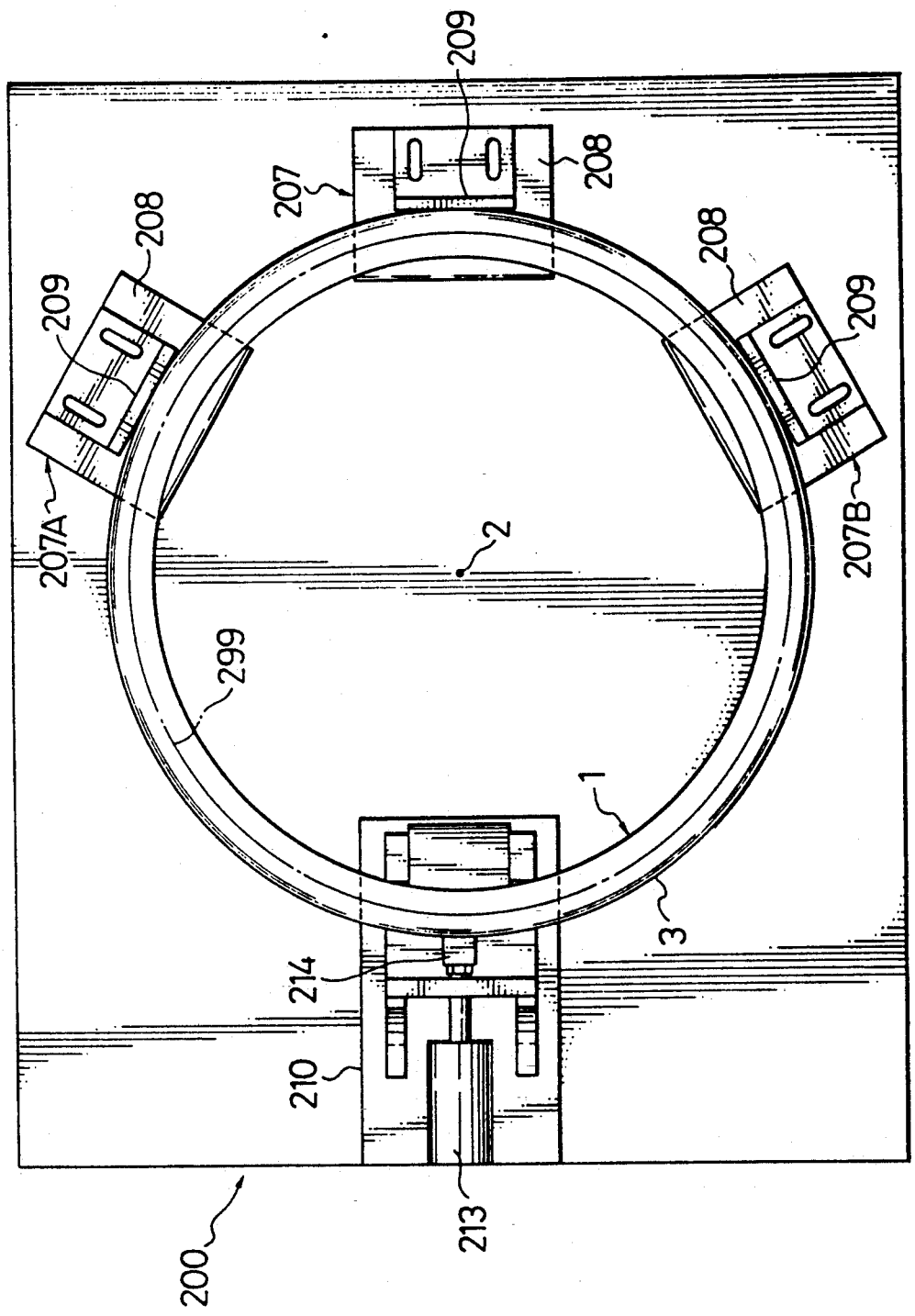
FIG. 4 is a top plan view of of the arrangement illustrated in FIGS. 2 and 3 and a plurality of steering-wheel support tables by which the steering wheel is supported.

The support arrangement includes a plurality of support tables 207, 207A and 207B illustrated in FIG. 4, which are arranged in spaced relation to each other along a circle 299 substantially identical with the steering wheel 1 and arranged in the first plane, for supporting the steering wheel 1 horizontally. The support tables 207, 207A and 207B include their respective blocks 208 on which angled elements or positioning plates 209 are respectively mounted for pressing down the outer peripheral section 3 of the steering wheel 1 at locations on upper surface of the respective block 208. The positioning plates 209 are movable toward and away from the circle 299 in accordance with a peripheral length of the steering wheel 1. Specifically, the positioning plates 209 are slidable to their respective positions which are in conformance with the dimension of the outer peripheral section 3 of the steering wheel 1 and are fixed at the respective adjusted positions.

As shown in FIG. 4, a table plate 210 is arranged at an intermediate location between two 207A and 207B of the plurality of support tables, which are located respectively at both ends of an arc along which the support tables 207, 207A and 207B are arranged. The table plate 210 is so arranged as to extend across the steering wheel 1 in a diametrical direction thereof at a location below the steering wheel 1.

Figure 2:
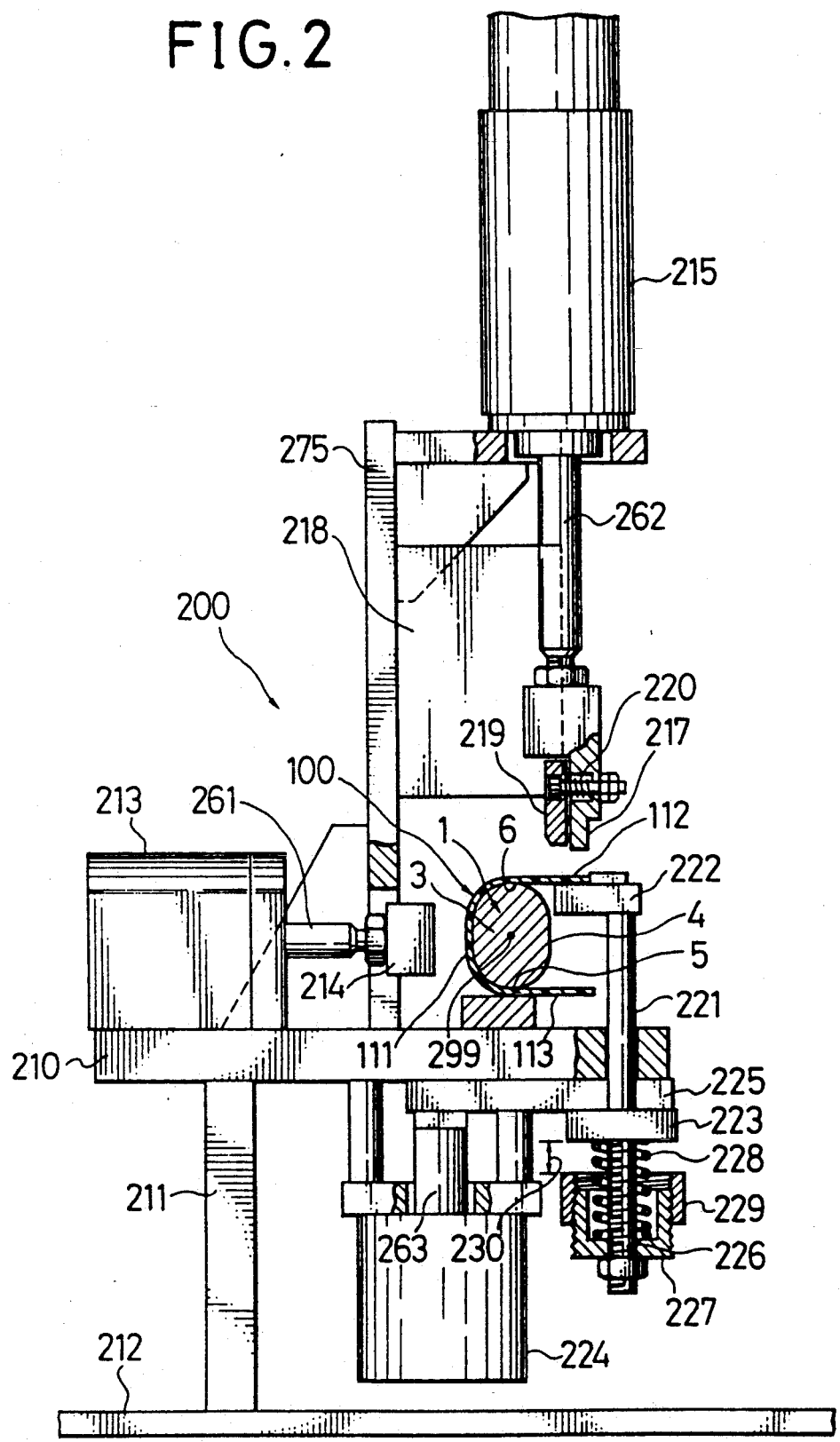
FIG. 2 is a fragmentary side elevational view of an apparatus for automatically wrapping the cover material illustrated in FIG. 1 about the steering wheel, according to a first embodiment of the invention, showing a condition immediately before operation of wrapping the cover material about the steering wheel.
Figure 3:
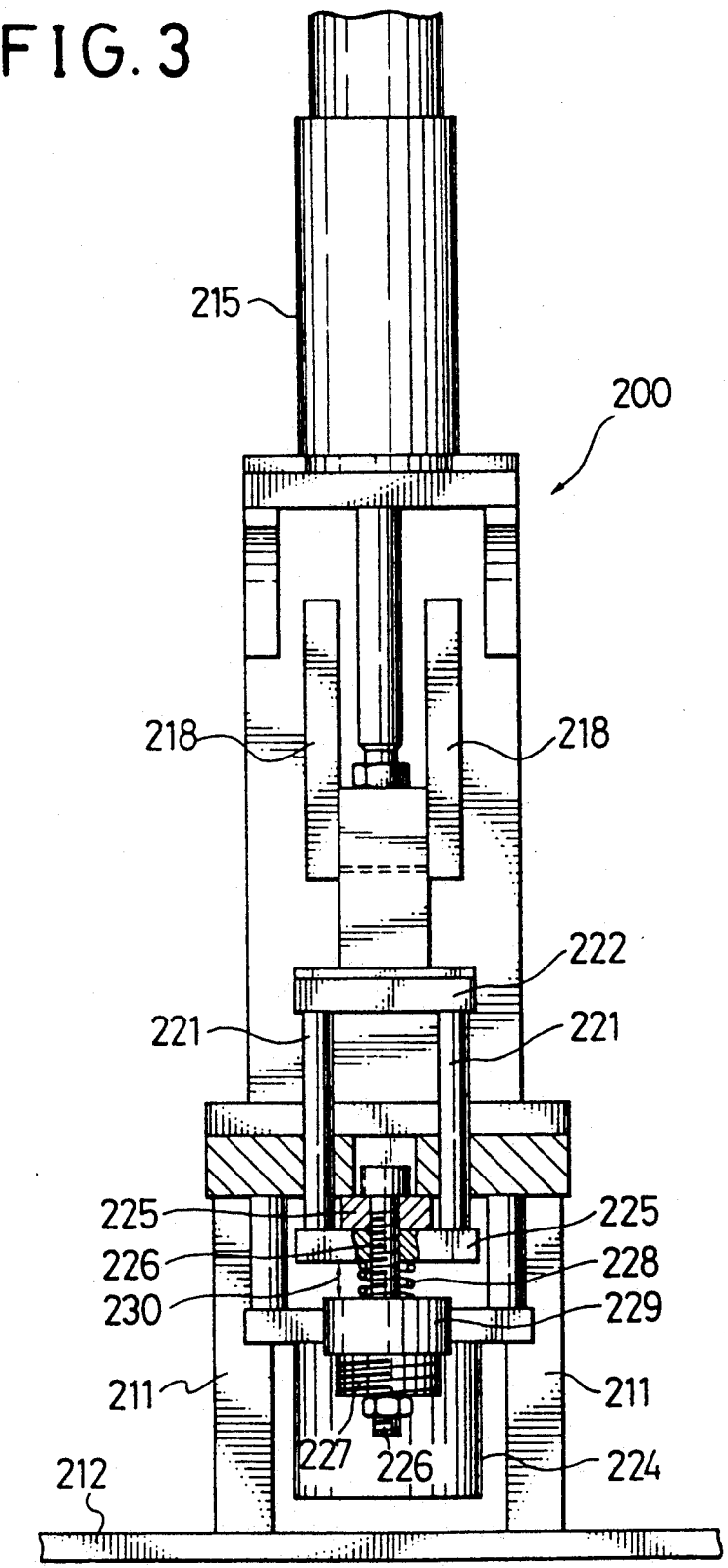
FIG. 3 is a right-hand side elevational view of an arrangement illustrated in FIG. 2.

As shown in FIGS. 2 and 3, a pair of posts 211 extend vertically from a base plate 212 for supporting the table plate 210. A piston/cylinder assembly 213 is mounted on the table plate 210. A presser 214 in the form of a block is mounted on a free end of a piston 261 of the piston/cylinder assembly 213, and the piston 261 is movable horizontally toward and away from the circle 299. That is, the piston 261 is movable along the diametrical line of the steering wheel 1. When the piston 261 is moved toward the circle 299, the presser 214 urges the annular strip body 111 of the cover material 100 against the outer peripheral section 3 of the steering wheel 1. Specifically, when the piston 261 is extended, the presser 214 urges the outer peripheral section 3 of the steering wheel 1 through the cover material 100 to fix the steering wheel 1 at a location between the positioning plates 209 and the presser 214.

As shown in FIGS. 2 and 3, the pincher arrangement includes a pincher 217 and a piston/cylinder assembly 215 having a piston 262. The pincher 217 is mounted on a free end of the piston 262. The piston 262 is movable along a vertical line extending in parallel relation to the second plane toward and away from the circle 299. That is, the piston 262 is movable along the vertical line passing through a location on the table plate 210 adjacent to the inner peripheral section 4 of the steering wheel 1. The pincher 217 is connected to or mounted on the piston 262 for urging the upper surface of the upper side skirt 112 of the cover material 100, which extends radially inwardly, so as to be urged against the upper side section 6 of the steering wheel 1. A pair of guides 218 and 218 are mounted on the table plate 210 through a vertical plate 275, for guiding vertical movement of the pincher 217.

A wiper 219 is connected to the pincher 217 through a spring 220, for urging the upper side skirt 112 against the inner peripheral section 4 of the steering wheel 1 when the piston 262 of the piston/cylinder assembly 215 is moved downwardly or is extended. The pincher 217 and the wiper 219 are formed to have their respective surfaces which are curved in accordance with the inner peripheral section 4 of the steering wheel 1.

A pair of slide shafts 221 and 221 extend through an end of the table plate 210 adjacent to the inner peripheral section 4 of the steering wheel 1, for vertical movement. A pincher receiver 222 is fixedly connected to upper ends of the respective slide shafts 221 and 221 so as to extend therebetween, for receiving the pincher 217 in contact with a lower surface of the upper side skirt 112 of the cover material 100. The pincher receiver 222 is formed to have a surface which is curved in accordance with the inner peripheral section 4 of the steering wheel 1. A spring-receiving plate 223 is fixedly mounted to the lower ends of the slide shafts 221 and 221 so as to extend therebetween.

A piston/cylinder assembly 224 has a piston 263, and a pressing-down plate 225 is connected to a free end of the piston 263 of the piston/cylinder assembly 224 for moving the spring-receiving plate 223 toward and away from the one side skirt 112 of the cover material 100. The piston/cylinder assembly 224 is mounted on the lower surface of the table plate 210 at a location adjacent to an intermediate section thereof. Specifically, the pressing-down plate 225 is connected to the piston 263 for pressing down the spring-receiving plate 223 upon downward movement of the piston 263. A screw bolt 226 is threadedly engaged with a forward end of the pressing-down plate 225 and extends vertically through the spring-receiver plate 223. A cylindrical cup-like spring-receiver element 227 is threadedly engaged with a lower end of the screw bolt 228. A coil spring 228 is associated with the pincher receiver 222 for biasing the same against the lower surface of the one side skirt 112 of the cover material 100. That is, the coil spring 228 is arranged between the spring-receiver plate 223 and the spring-receiver element 227. The coil spring 228 biases the pincher receiver 222 such that the pincher receiver 222 is always urged against the lower surface of the upper side skirt 112 of the cover material 100, and for always urging the spring-receiver plate 223 against the lower surface of the pressing-down plate 225. A stopper nut 229 is threadedly engaged with an outer peripheral section of the spring-receiver element 227. The stopper nut 229 is movable vertically through suitable pitches to adjust a spacing 230 between the spring-receiver plate 223 and the stopper nut 229 so as to conform to a length through which the upper side skirt 112 of the cover material 100 is extended toward the inner peripheral section 4 of the steering wheel 1.

The above-described arrangement of the apparatus 200 is controlled by a sequential automatic control circuit (not shown) in the following manner.

That is, adhesives are applied to at least one of the steering wheel 1 and the cover material 100. The steering wheel 1 is covered with the cover material 100 from the outer peripheral section 3 of the steering wheel 1 toward the both side sections 5 and 6 thereof. The steering wheel 1 is covered with the cover material 100 such that a horizontal center line between both the side skirts 112 and 113 of the cover material 100 is in agreement with a horizontal center line of the outer peripheral section 3 of the steering wheel 1. The steering wheel 1 is mounted horizontally on the steering-wheel support tables 207, 207A and 207B as shown in FIGS. 2 and 4.

Figure 5:
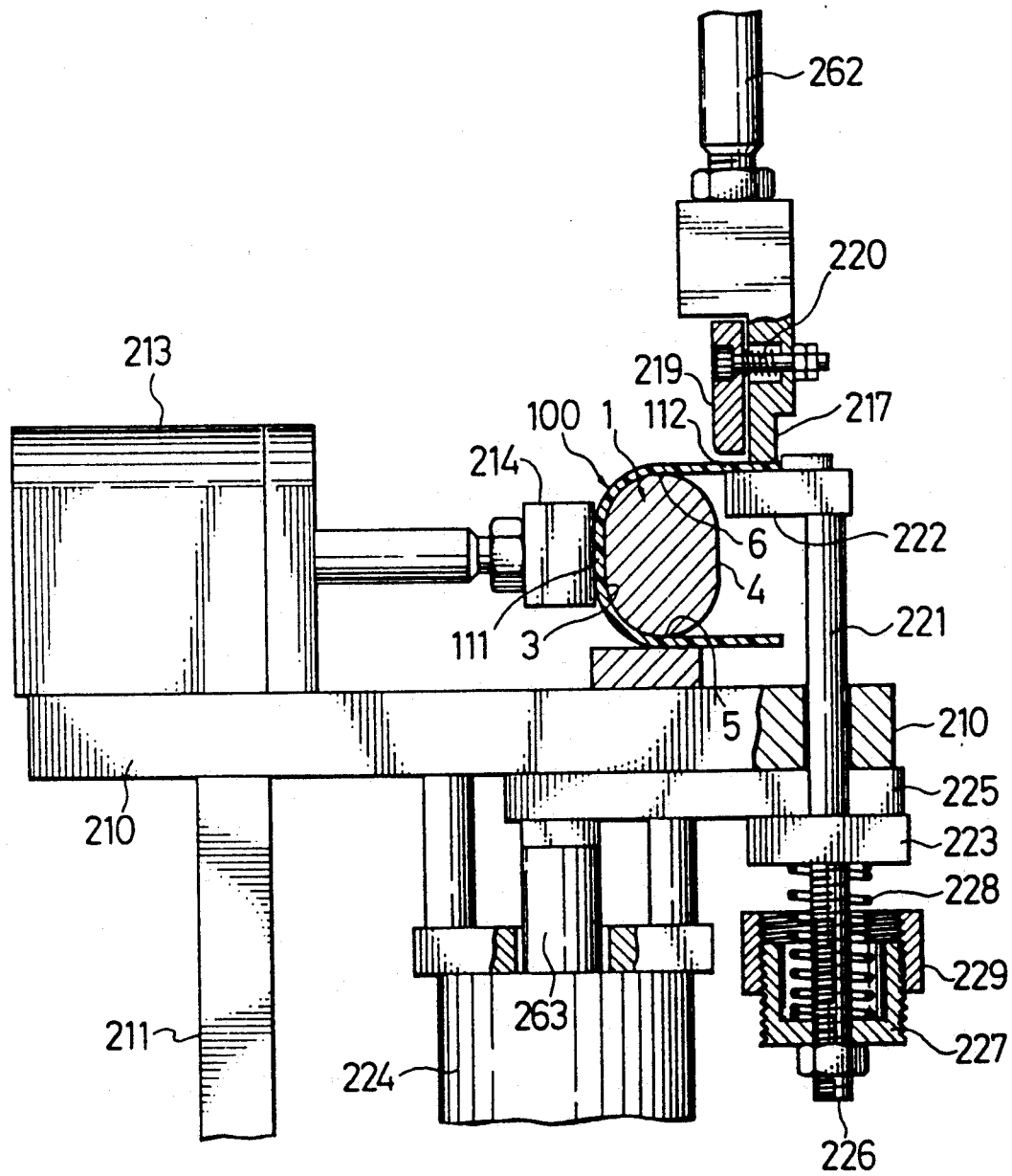
FIG. 5 is a fragmentary view of the arrangement illustrated in FIG. 2, showing a condition in which the steering wheel is fixed on the steering-wheel support tables, and an upper side skirt of the cover material is clamped between a pincher and a pincher receiver.

Under such a condition that the upper side skirt 112 of the cover material 100 is mounted on the upper surface of the pincher receiver 222, the piston 261 of the piston/cylinder assembly 213 is first moved toward the outer peripheral section 3 of the steering wheel 1. Then, as shown in FIG. 5, the presser 214 urges the cover material 100 against the outer peripheral section 3 of the steering wheel 1 to fix the same at the location between the presser 214 and the positioning plates 209 and, simultaneously, urges the annular strip body 111 of the cover material 100 against the outer peripheral section 3 of the steering wheel 1 such that the cover material 100 cannot be shifted or moved. At this time, the above-described operation of the piston/cylinder assembly 213 is halted.

Immediately thereafter, the piston/cylinder assembly 215 is operated such that the piston 262 is moved downwardly. By doing so, as shown in FIG. 5, the pincher 217 is moved downwardly to clamp the upper side skirt 112 of the cover material 100 between the pincher receiver 222 and the pincher 217 from both the upper and lower surfaces of the upper side skirt 112.

Figure 6:
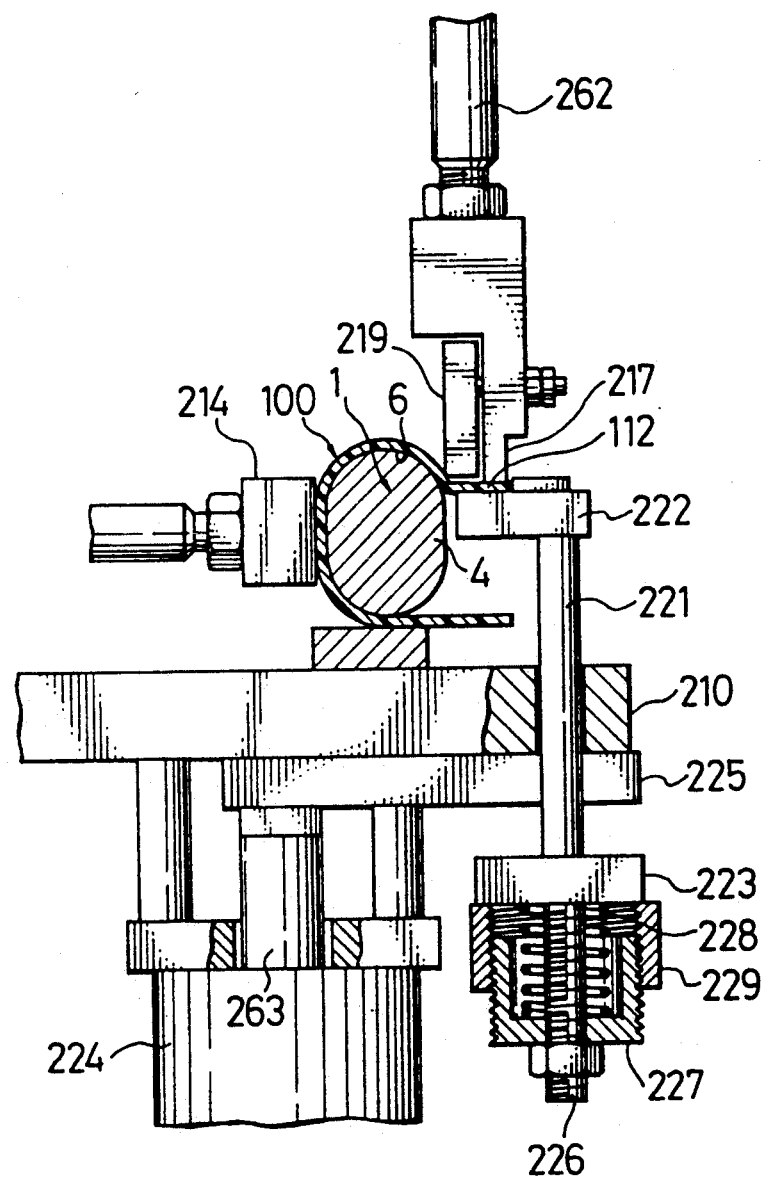
FIG. 6 is a view similar to FIG. 5, but showing a condition in which the upper side skirt of the cover material is stretched toward an inner peripheral section of the steering wheel.

Further, as shown in FIG. 6, the pincher 217 is moved downwardly while pressing down the pincher receiver 222 against the biasing force of the coil spring 228, to wrap up the upper side skirt 112 into the inner peripheral section 4 of the steering wheel 1 while stretching out the upper side skirt 112. Simultaneously, the wiper 219 is moved downwardly while urging the cover material 100 against the steering wheel 1, to adhere the cover material 100 to the upper side section 6 of the steering wheel 1. In interlocking with the pressing-down of the pincher receiver 222, the spring-receiving plate 223 is moved downwardly. When the spring-receiving plate 223 is abutted against the stopper nut 229, the piston/cylinder assembly 215 is locked so that downward operation of the piston 262 is halted. Immediately thereafter, the piston/cylinder assembly 224 is so operated that the piston 263 is moved downwardly.

Figure 7:
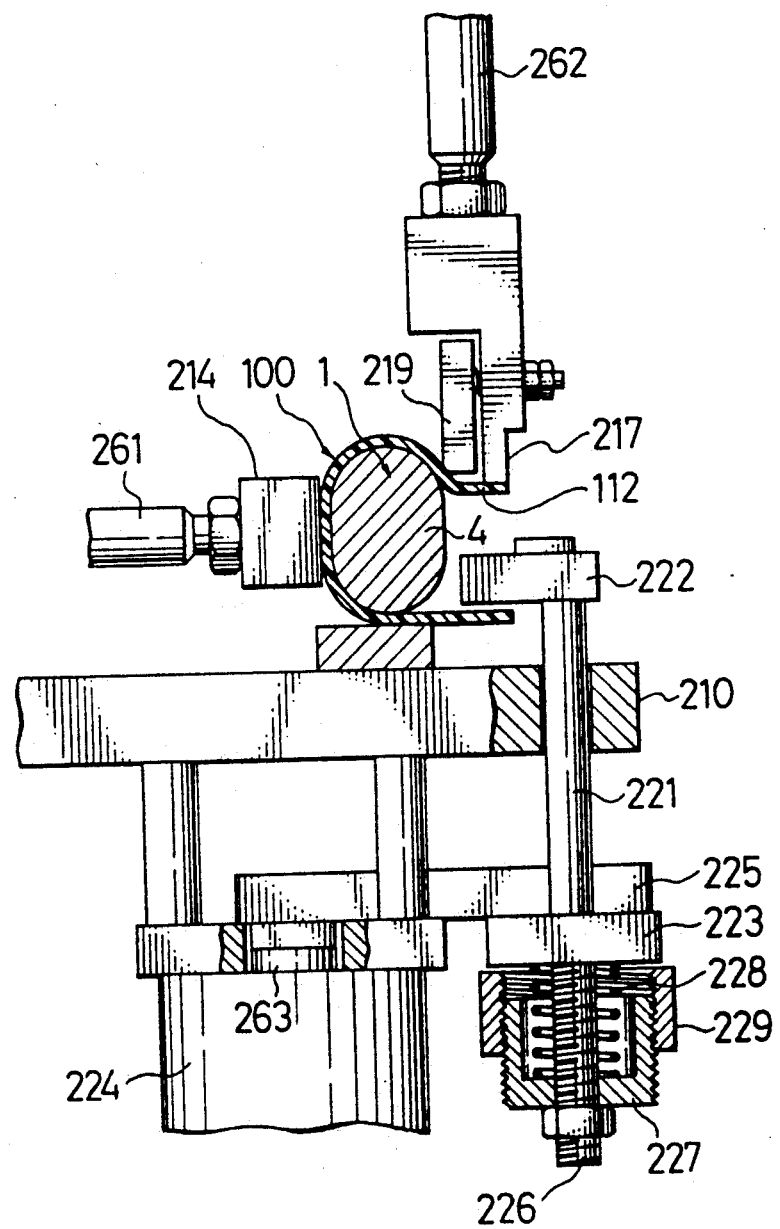
FIG. 7 is a view similar to FIG. 6, but showing a condition in which the pincher receiver is moved downwardly so that clamping of the upper side skirt of the cover material is released.

Then, as shown in FIG. 7, the pressing-down plate 225, the screw bolt 226, the spring-receiver element 227 and the stopper nut 229 are moved downwardly. From the intermediate point of the downward movement, the pressing-down plate 225 presses down the spring-receiving plate 223. Since movement of the spring-receiving plate 223 is transmitted to the pincher receiver 222 through the pair of slide shafts 221 and 221, the pincher receiver 222 is moved downwardly, and clamping of the upper side skirt 112 of the cover material 100 due to the pincher 217 and the pincher receiver 222 is released. At this time, operation of downward movement of the piston 263 of the piston/cylinder assembly 224 is halted. Immediately thereafter, the piston 262 of the piston/cylinder assembly 215 is so operated as to be slightly moved downwardly.

Figure 8:
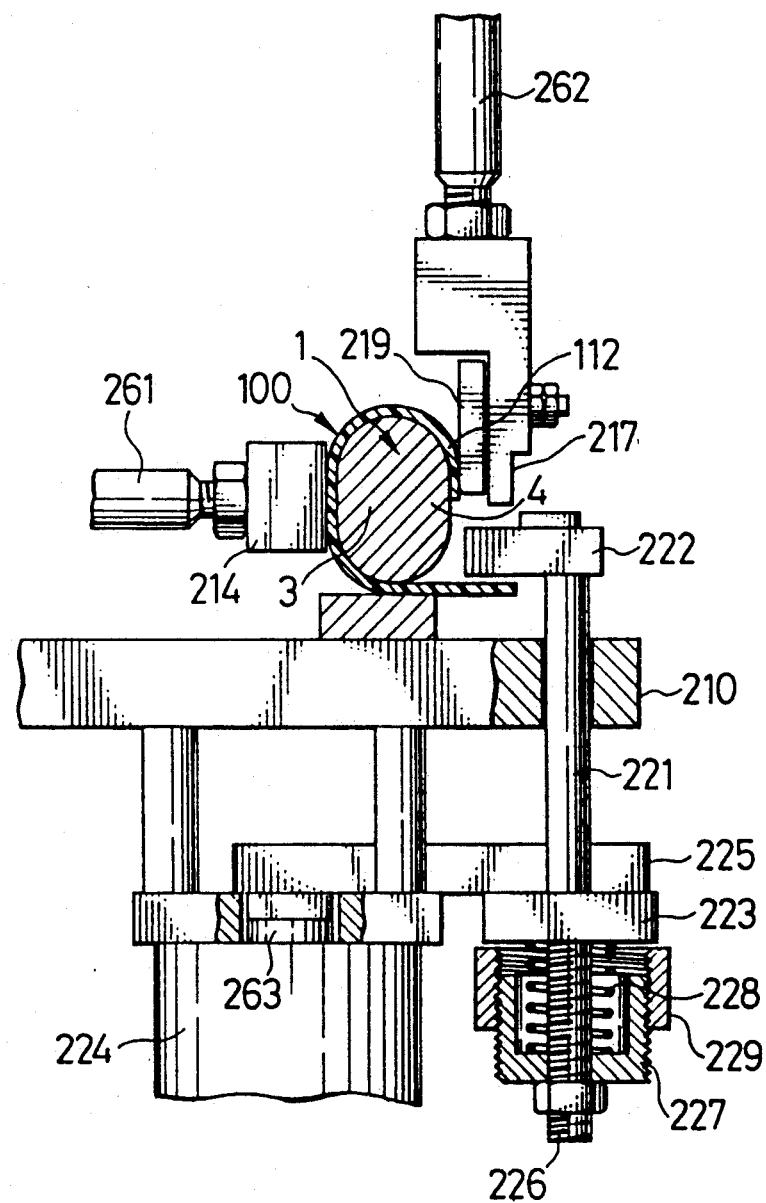
FIG. 8 is a view similar to FIG. 6, but showing a condition in which the upper side skirt of the cover material is urged against the inner peripheral section of the steering wheel by a wiper.

Then, as shown in FIG. 8, the pincher 217 and the wiper 219 are slightly moved downwardly so that the wiper 219 urges the upper side skirt 112 of the cover material 100 against the inner peripheral section 4 of the steering wheel 1 to adhere the upper side skirt 112 to the inner peripheral section 4. Immediately thereafter, the piston 262 of the piston/cylinder assembly 215 and the piston 263 of the piston/cylinder assembly 224 are so operated as to be moved upwardly. By doing so, the pincher 217 is returned to its original position, and the pressing-down plate 225 is also returned to its original position. Thus, the pair of slide shafts 221 and 221, the pincher receiver 222 and the spring-receiving plate 223 are returned to their respective original positions. At this time, the pistons 262 and 263 of the respective piston/cylinder assemblies 215 and 224 are halted in upward movement. Immediately thereafter, the piston 261 of the piston/cylinder assembly 213 is moved away from the outer peripheral section 3 of the steering wheel 1. Then, the presser 214 is returned to its original position so that fixing of the steering wheel 100 is released. At this point of time, the above-described operation of the piston/cylinder assembly 213 is halted.

By the above-described operation, wrapping of the cover material 100 has been completed with respect to a portion of the steering wheel 1, which extends from the outer peripheral section 3 to the inner peripheral section 4 through the upper side section 6.

Then, the steering wheel 1 is moved angularly about the axis 2 manually or with power such that the partially wrapped portion of the cover material 100 is released from the table plate 210, and the succeeding portion of the cover material 100 reaches the table plate 210, while the steering wheel 1 is mounted on the steering-wheel support tables 207, 207A and 207B. Then, the above-described operation is repeated. By repeat of the operation, the succeeding portion of the upper side skirt 112 of the cover material 100 is wrapped about the the succeeding portion of the steering wheel 1. In this manner, the cover material 100 is wrapped about the upper half of the steering wheel 1.

Then, the steering wheel 1 is turned over, i.e., is moved angularly about an axis perpendicularly to the axis 2. The above-described operation is repeated. Thus, the remaining half of the cover material 100 is wrapped about the remaining half of the steering wheel 1. In this manner, the entire steering wheel 1 is covered with the cover material 100.

Figure 9:
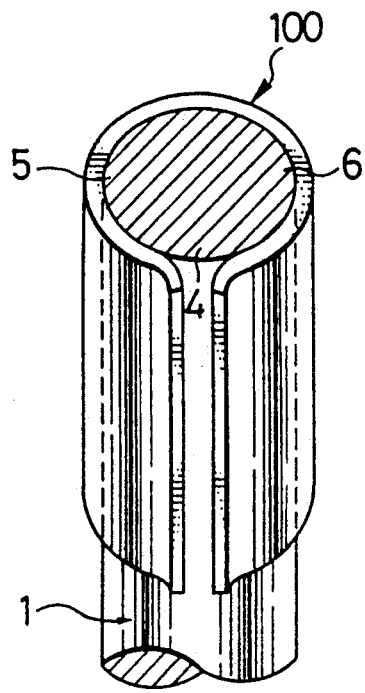
FIG. 9 is a fragmentary view of a modification in which adhering of both the side skirts of the cover material to the steering wheel is modified.

In connection with the above, as shown in FIG. 9, the arrangement may be such that the cover material 100 has both side edges portions which are not adhered to the inner peripheral section 4 of the steering wheel 1 at locations slightly shifted from the center line of the inner peripheral section 4 toward both sides 5 and 6, and adhering of both the side edge portions of the cover material 10 relies upon manual finish operation.

It is to be noted that, in the above-described first embodiment and various embodiments to be described subsequently, the pincher 217 and the pincher receiver 222 may be arranged in a positional relationship reversed from the positional relationship illustrated in FIG. 2, that is, the pincher receiver 222 may be arranged above the pincher 217. Further, the presser 214, the pincher 217, the wiper 219 or the pincher receiver 222 may be operated by an air or hydraulic piston/cylinder assembly and, in addition thereto, may be operated by a drive unit such as a motor or the like.

Further, although the first embodiment has been described as having used together with the steering wheel 1 which has been set horizontally on the support table 207, 207A and 207B, it will be apparent to one skilled in the art that the support tables may be arranged vertically so that the steering wheel is supported thereby vertically, that is, the axis 2 extends horizontally.

A method of wrapping the cover material 100 about the steering wheel 1 will be described with reference to FIGS. 10 through 12.

Figure 10:
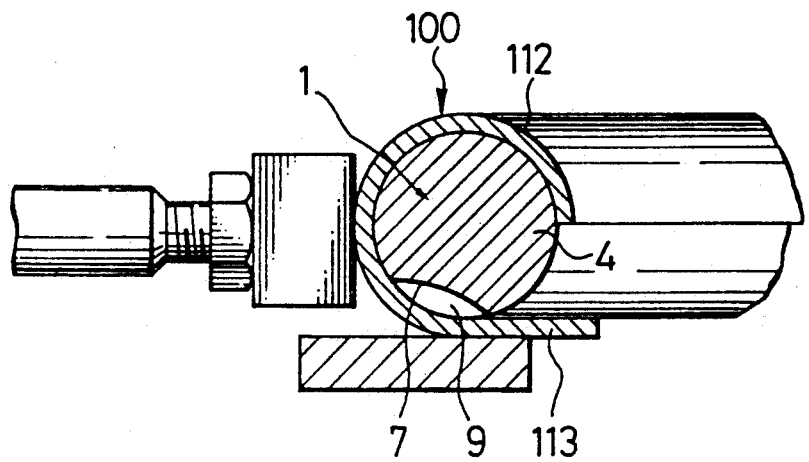
FIG. 10 is a fragmentary cross-sectional view showing a condition in which the cover material is adhered to the steering wheel by the automatic wrapping apparatus illustrated in FIGS. 2 through 8, from one of the pair of side skirts of the cover material to a location adjacent to finger-applying recesses formed in a side surface of the steering wheel.

First, as shown in FIG. 10, the cover material 100 covered on the steering wheel 1 through adhesives such that both the side edges of the respective side skirts 112 and 113 are abutted against each other at the inner peripheral section 4 of the steering wheel 1 is adhered to the steering wheel 1 while the cover material 100 is wrapped about the steering wheel 1 from the upper side skirt 112 to a location adjacent to a corresponding finger-applying recess 7 formed in the rear section of the steering wheel 1.

Figure 11:
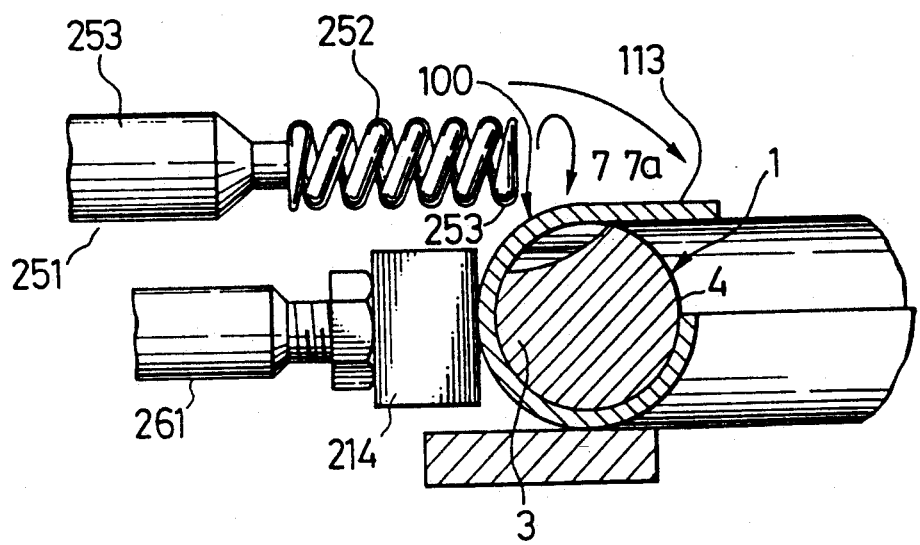
FIG. 11 is a view for explanation of a step of adhering a non-adhering portion of the cover material illustrated in FIG. 10 to the recess by means of an urging tool.
Figure 12:
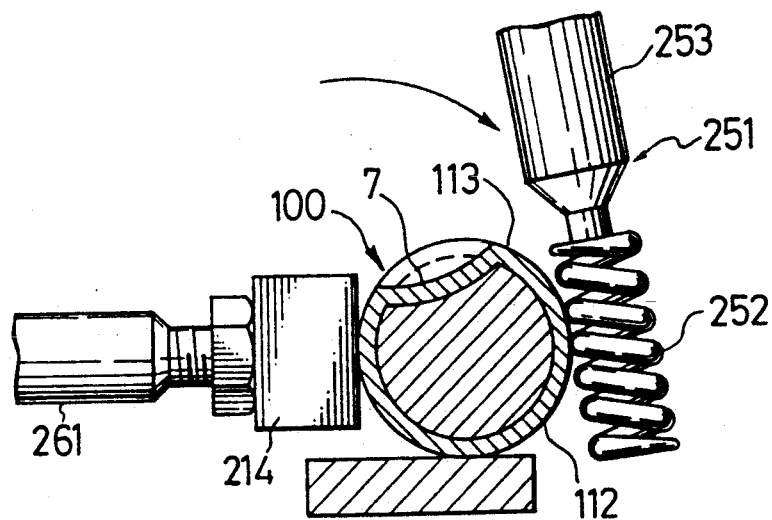
FIG. 12 is a view showing a condition in which adhering of the non-adhering portion illustrated in FIGS. 10 and 11 has been completed.

Then, the steering wheel 1 is once removed or detached from the automatic wrapping apparatus 200, and the steering wheel 1 is turned over or reversed as shown in FIG. 11. The steering wheel 1 is again set in the automatic wrapping apparatus 200 under such a condition that the remaining side skirt 113 of the cover material 100 is directed horizontally. Then, an urging tool 251 is prepared which has an urging surface following a concave surface 7a of each of the recesses 7 in the steering wheel 1. For example, as shown in FIG. 11, a coil spring 252 is prepared which is high in spring constant and which is so formed as to have an outer peripheral surface 253 following the concave surface 7a the recess 7. The coil spring 252 has a proximal end which is rotatably connected to a forward end of a grip section 253 which can be grasped by an operator's hand. The coil spring 252 is rotatively driven by a motor which is incorporated in the grip section 253. The coil spring 252 is moved under such a condition that the coil spring 252 is rotated at 20 to 30 RPM, along a wrapping direction for each recess 7 at a location on the non-adhering portion of the cover material 100. That is, the coil spring 252 is moved from the side of the outer peripheral section 3 of the steering wheel 1 toward the side of the inner peripheral section 4 thereof while urging the non-adhering portion of the cover material 100 against the recess 7. In process of the above movement of the coil spring 252, by an action of stretching the cover material 100 due to a lead pitch and the adjacent lead pitch of the coil spring 252, the non-adhering portion is urged against and adhered to each of the recesses 7, as shown in FIG. 12. The side edge of the side skirt 113 of the cover material 100 is abutted against the side edge of the side skirt 112. In this manner, wrapping of the cover material 100 is completed.

The above-described operation may be practiced by a robot. Further, the above-mentioned arrangement may be incorporated in the automatic wrapping apparatus 200 as a part thereof.

Second Embodiment

Referring next to FIGS. 13 through 19, there is shown an apparatus 300 for automatically wrapping the cover material 100 about the steering wheel 1.

Figure 13:
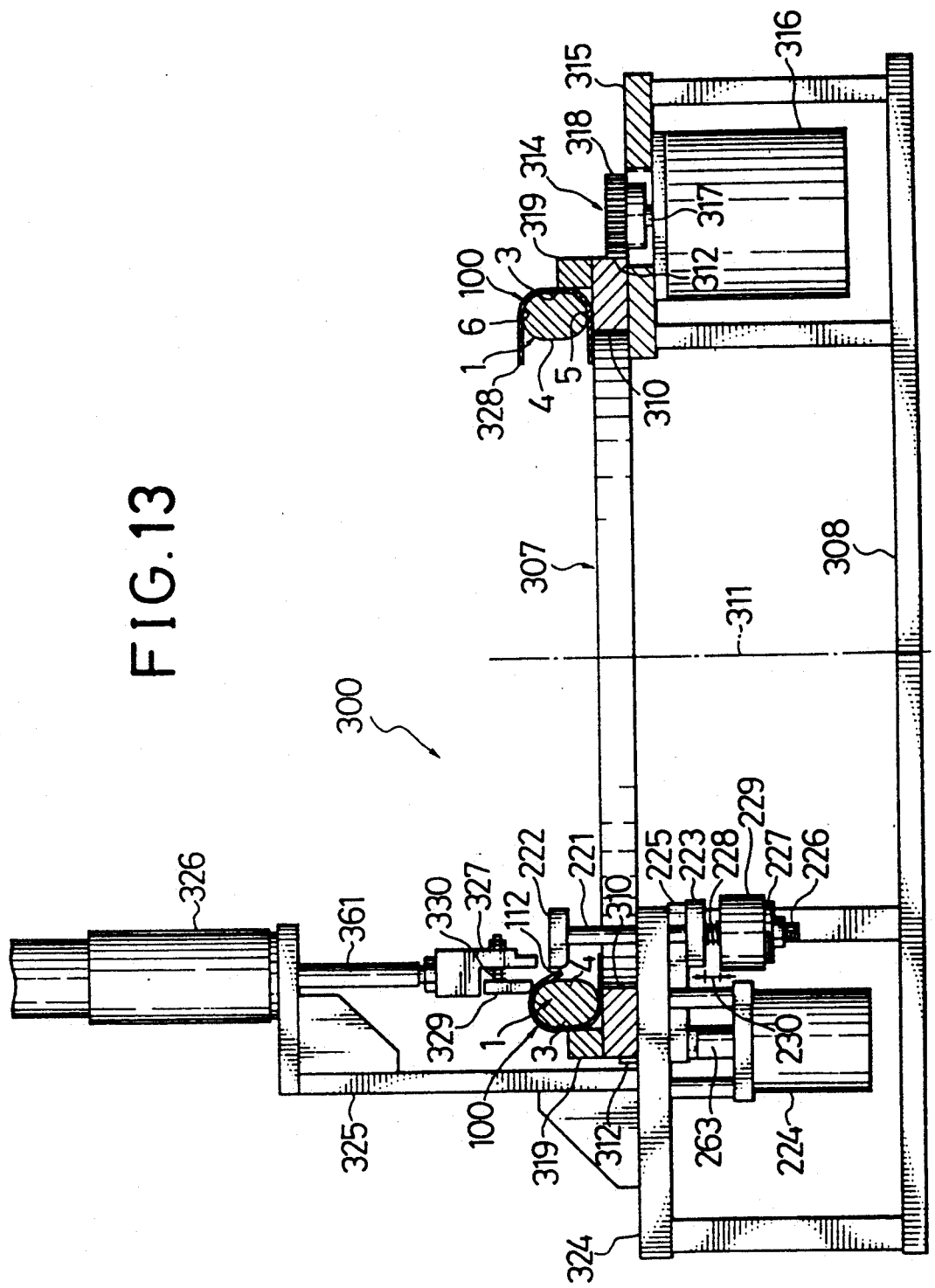
FIG. 13 is a side elevational view of an apparatus for automatically wrapping a cover material illustrated in FIG. 1 about the steering wheel, according to a second embodiment of the invention, showing a condition immediately before operation of wrapping the cover material about the steering wheel.
Figure 15:
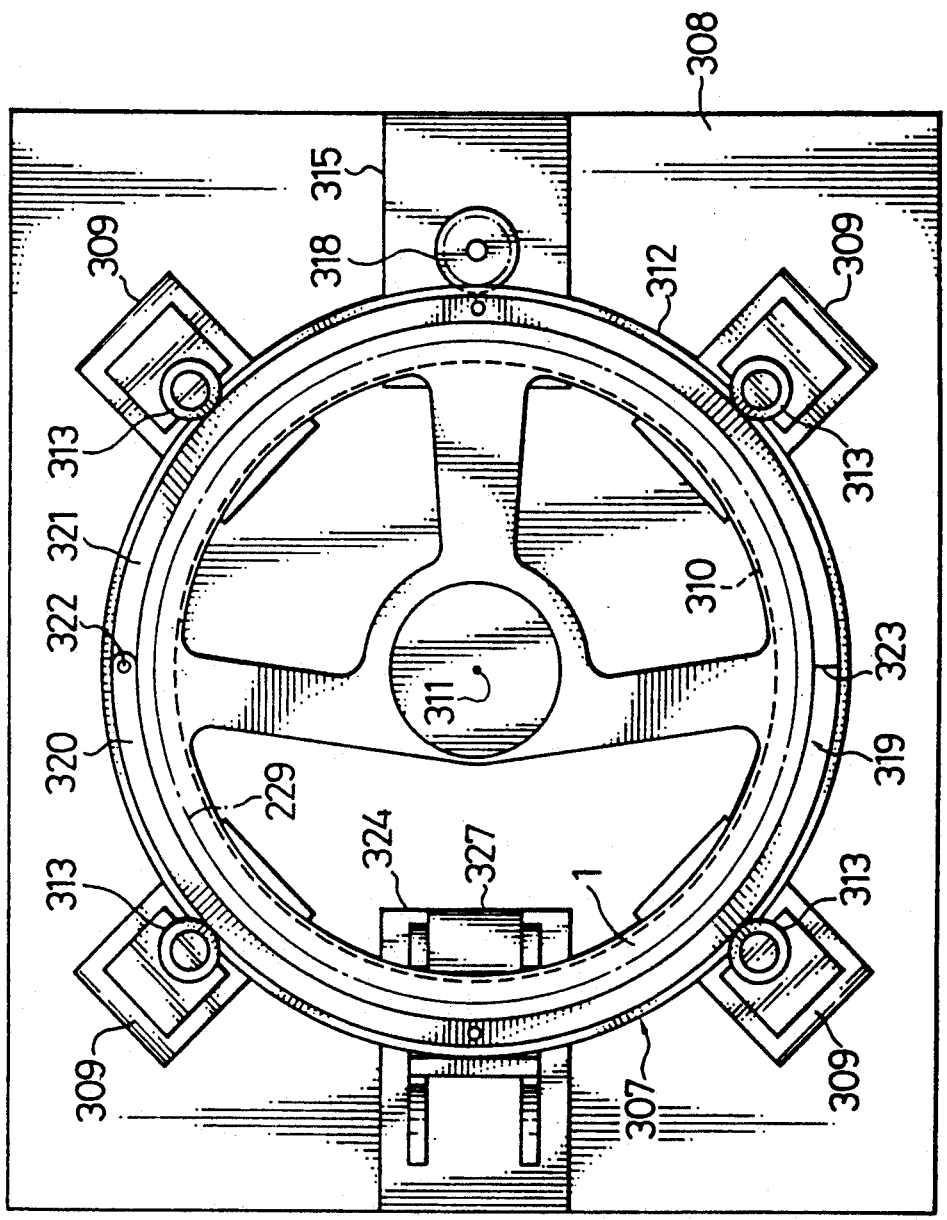
FIG. 15 is a top plan view of a plurality of steering-wheel support tables by which the steering wheel is supported, showing a condition in which the steering wheel is supported horizontally by the support tables.

The automatic wrapping apparatus 300 comprises a steering-wheel support table assembly 307 which is moved angularly about an axis 311 while supporting the steering wheel 1 horizontally. As shown in FIG. 15, the support table assembly 307 includes a plurality of table blocks 309 fixedly arranged in spaced relation to each other along the circle 299 substantially identical with the steering wheel 1, and an annular horizontal table 310 supported by upper sections of the respective table blocks 309 for angular movement about the axis 311. As shown in FIG. 13, an outer peripheral surface of the annular table 310 has a lower half on which driven gear teeth 312 are formed or provided. A plurality of guide rollers 313 are arranged in spaced relation to each other along the circle 299 and in contact with an upper half of the outer peripheral surface of the annular table 310. That is, the guide rollers 313 are arranged respectively on the table blocks 309.

As shown in FIG. 13, a drive arrangement 314 rotatively drives the annular table 310 about the axis 311. The drive arrangement 314 comprises a table block 315 which is fixedly mounted on an upper surface of a base plate 308 at an intermediate location of at least one of intervals between the table blocks 309. A motor 316 such as a pulse motor, a stepping motor or the like is fixedly mounted on the table block 315 such that an output rotary shaft 317 extends upwardly. A pinon gear 318 is fixedly mounted on the rotary shaft 317, and is in mesh with the driven gear teeth 312.

A clamp 319 clamps the cover material 100 to the entire outer peripheral section of the steering wheel 1 at a location of the upper surface of the annular table 310. As shown in FIG. 15, the clamp 319 includes a pair of semicircular clamp rods 320 and 321. The pair of semicircular clamp rods 320 and 321 cooperate with each other to define the circle 229. The pair of semicircular clamp rods 320 and 321 have their respective one ends which are connected to the annular table 310 by a pin 322 and are movable toward and away from each other. Latching elements 323 are provided respectively on the other ends of the respective clamp rods 320 and 321.

As shown in FIG. 13, a table block 324 is fixedly connected to the base plate 308 at a location opposed to the table block 315 in the upper surface of the base plate 308. A post 325 is fixedly mounted on the table block 324. A fine lock piston/cylinder assembly 326 is supported by the post 325. The piston/cylinder assembly 326 is arranged such that a piston 361 is moved vertically on the vertical line above a location adjacent to the inner peripheral section 4 of the steering wheel 1 which is supported by the annular table 310. A wiper holder 327 is fixedly mounted on the piston 361 of the piston/cylinder assembly 326. A wiper 329 is movably connected to the wiper holder 327 through a spring 330 for wrapping up the upper side skirt 112 of the cover material 100 extending radially inwardly from the lateral edge of the annular strip body 111 thereof, into the inner peripheral section 4 of the steering wheel 1 when the piston 361 is extended downwardly. The wiper 329 is so formed as to have an arcuate surface in conformance with the annular configuration of the inner peripheral section 4 of the steering wheel 1.

Figure 14:
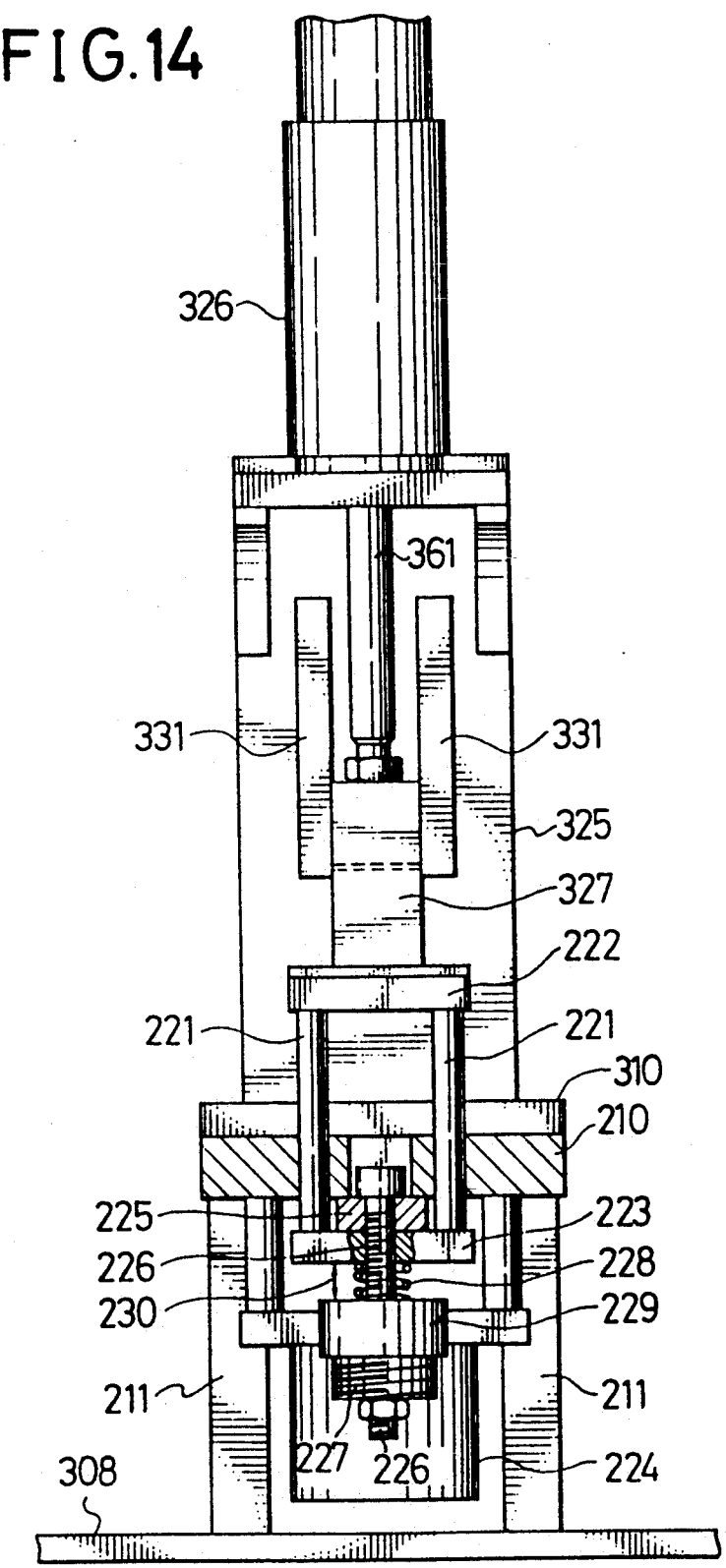
FIG. 14 is a fragmentary right-hand side elevational view of an arrangement including a pincher, a wiper, a pincher receiver or the like illustrated in FIG. 13.

As shown in FIG. 14, a pair of guides 331 and 331 are mounted to the post 325 for guiding vertical movement of the wiper 329.

Figure 16:
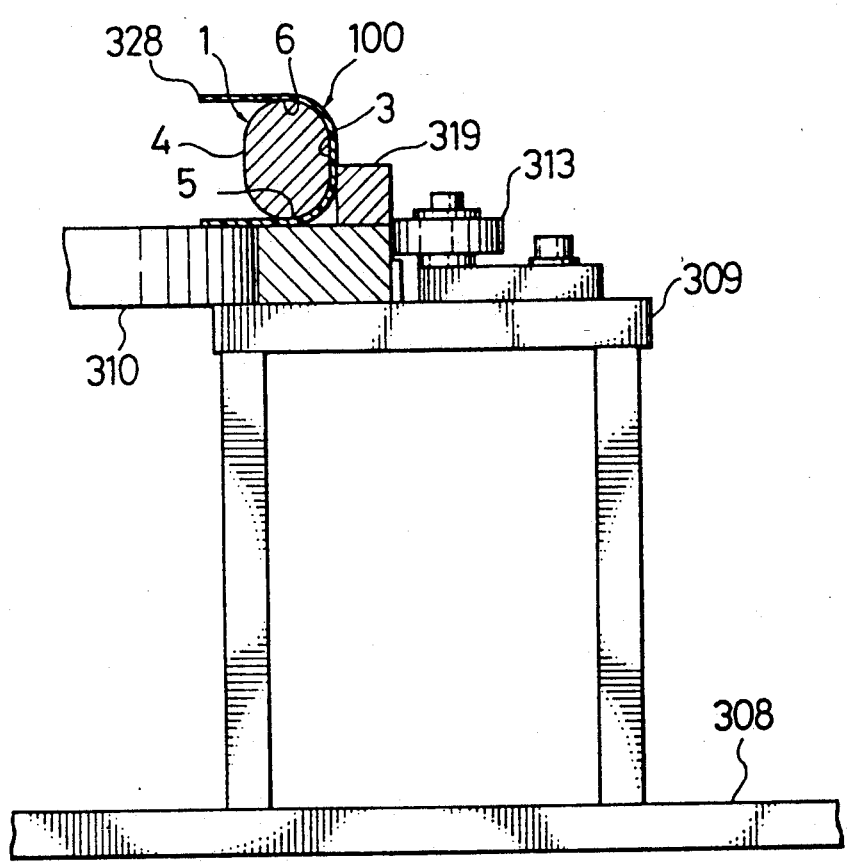
FIG. 16 is a fragmentary right-hand side elevational view of one of the steering-wheel support tables illustrated in FIG. 15.
Figure 17:
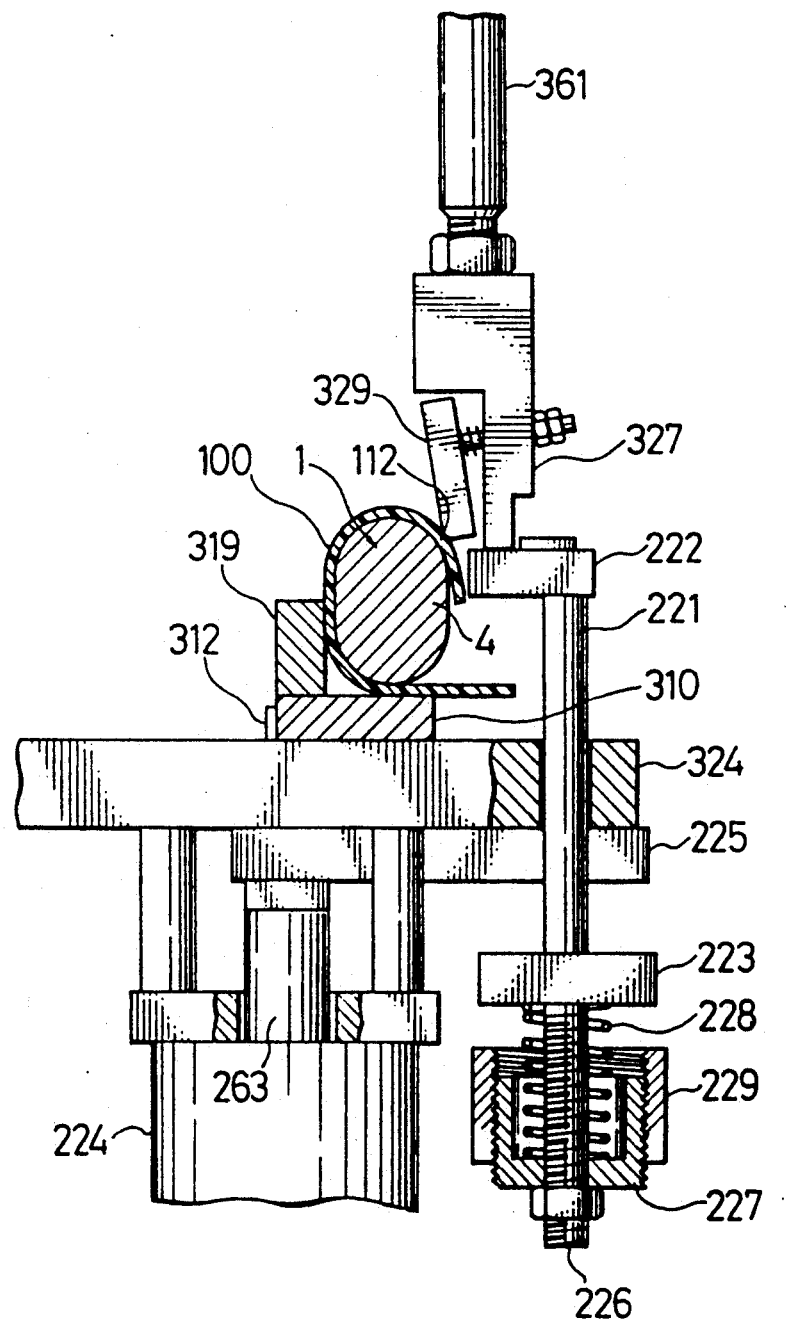
FIG. 17 is a fragmentary view of the arrangement illustrated in FIG. 14, showing a condition in which can upper side skirt of the cover material is wrapped up in the inner peripheral section of the steering wheel.

In operation, the steering wheel 100 is mounted horizontally on the annular table 310 as shown in FIG. 16. Subsequently, the pair of clamp rods 320 and 321 of the clamp 319 illustrated in FIG. 15 are closed to claim the cover material 100 to the outer peripheral section 3 of the steering wheel 1. Under this condition, the piston 361 of the piston/cylinder assembly 326 is so operated as to be moved downwardly. By doing so, as shown in FIG. 17, the wiper holder 327 is moved downwardly to press down the receiver plate or pincher receiver 222 against the biasing force of the coil spring 228. Simultaneously, the wiper 329 is moved downwardly at a location slightly adjacent to the inner peripheral section 4 of the steering wheel 1 against the biasing force of the spring 228, while being inclined such that the upper side skirt 112 of the cover material 100 is urged against the steering wheel 1 while stretching the upper side skirt 112. Thus, the cover material 100 is adhered to an area from the outer peripheral section 4 of the steering wheel 1 to the upper section thereof. At this time, the piston/cylinder assembly 326 is locked so that downward movement of the piston 361 is halted.

Immediately thereafter, the piston/cylinder assembly 224 is so operated that the piston 263 is moved downwardly.

Figure 18:
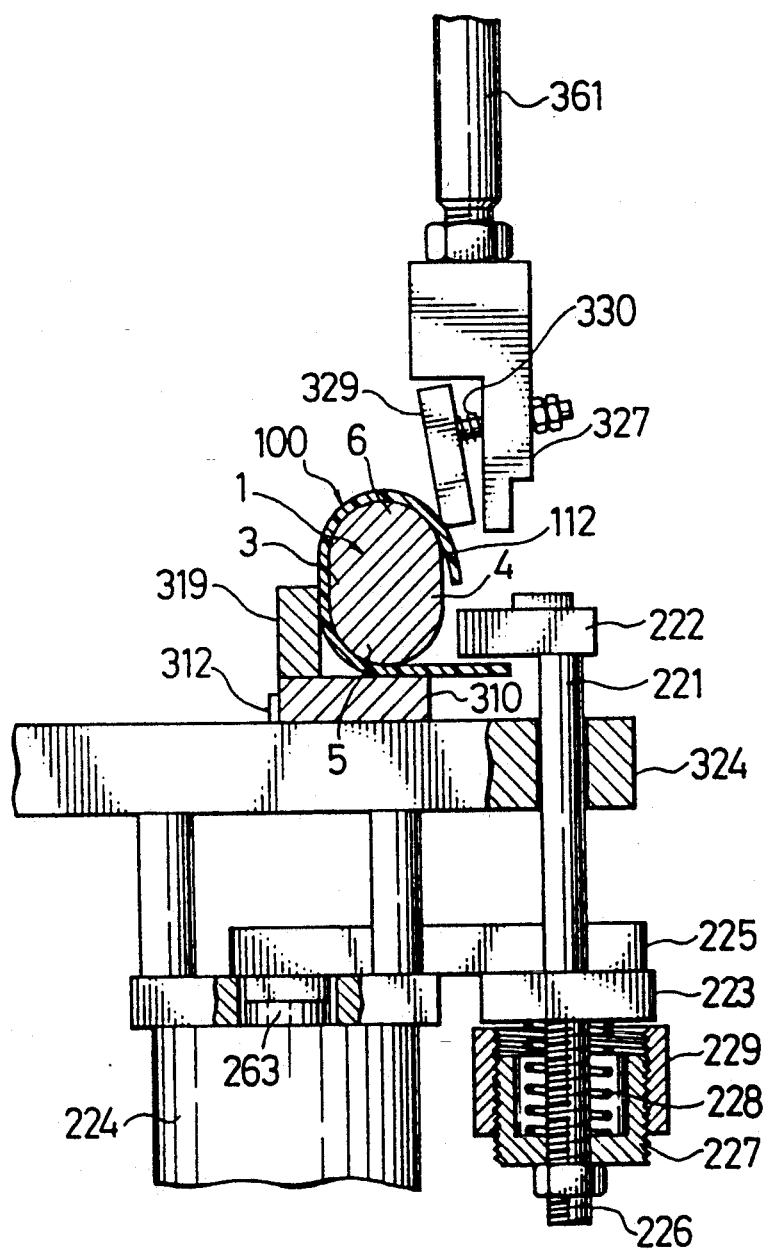
FIG. 18 is a view similar to FIG. 17, but showing a condition in which a pincher receiver is moved downwardly.
Figure 19:
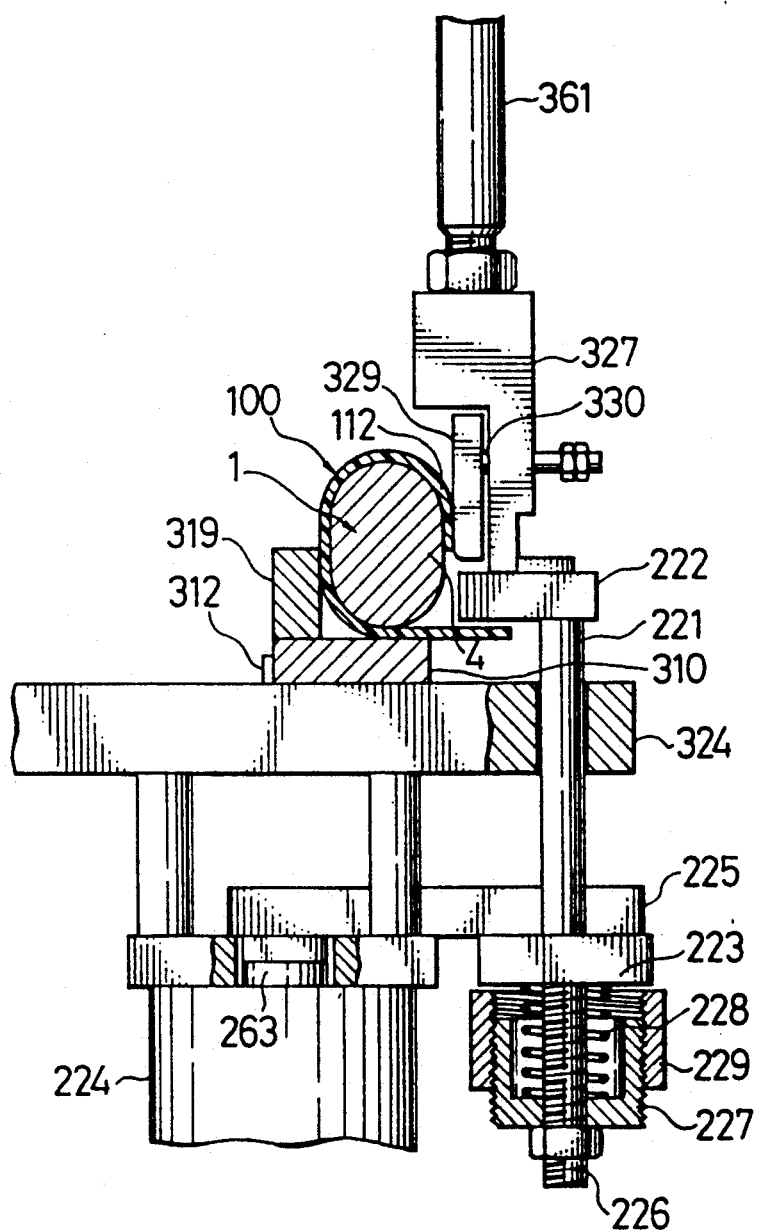
FIG. 19 is a view similar to FIG. 17, but showing a condition in which the upper side skirt of the cover material is urged against the inner peripheral section of the steering wheel by means of the wiper.

By doing so, as shown in FIG. 18, the pressing-down plate 225, the screw bolt 226, the spring-receiving plate 223, the stopper nut 229 and the spring-receiving element 227 are moved downwardly. From the intermediate point of the downward movement, the pressing-down plate 225 presses down the spring retainer or spring-receiving element 223. The pressing-down movement of the spring-receiving element 223 is transmitted to the pincher receiver 222 through the pair of slide shafts 221 and 221. Thus, the pincher receiver 222 is moved downwardly. At this point of time, the piston/cylinder assembly 224 halts such operation that the piston 263 is moved downwardly. Immediately thereafter, the piston/cylinder assembly 326 is so operated that the piston 361 of the piston/cylinder assembly 326 is moved downwardly. By doing so, as shown in FIG. 19, the wiper 329 changes its orientation vertically against the biasing force of the spring 330. The wiper 329 is moved downwardly while wrapping up the upper side skirt 112 of the cover material 100 into the inner peripheral section 4 of the steering wheel 1, to urge and adhere the upper side skirt 112 of the cover material 100 against and to the inner peripheral section 4 of the steering wheel 1. At this point of time, the wiper holder 327 is received by the pincher receiver 222 so that downward movement of the piston 361 of the piston/cylinder assembly 326 is halted.

Immediately thereafter, the piston/cylinder assemblies 326 and 224 are so operated that their respective pistons 361 and 263 are moved upwardly. By doing so, the wiper 329 is returned to its original position, and the pressing-down plate 225 is also returned to its original position. Thus, the pair of slide shafts 221 and 221, the pincher receiver 222 and the spring-receiving element 223 are returned to their respective original positions under the biasing force of the coil spring 228. At this time, operation of the pistons 361 and 263 of the respective piston/cylinder assemblies 326 and 224 is halted.

By the operation described above, wrapping of the cover material 100 about a portion of the steering wheel 1 extending from the outer peripheral section 3 of the steering wheel 1 to the inner peripheral section 4 through the upper section has been completed.

Immediately thereafter, as shown in FIG. 13, the motor 316 is energized to rotate the output shaft 317. The rotation of the output shaft 317 is transmitted to the annular table 310 through the pinion gear 318, the driven gear 312 and the guide rollers 313, so that the annular table 310 is moved angularly about the axis 311. By the angular movement of the annular table 310, the portion of the cover material 100, which has been completed in partial wrapping about the steering wheel 1, is detached from the table block 324. A portion of the steering wheel 1 adjacent to the partially wrapped portion thereof reaches a location on the table block 324. At this time, the motor 316 is deenergized to half angular movement of the annular table 310 and, thereafter, the above-described operation is repeated. By repetition of the operation, the upper half of the cover material 100 above the center line extending perpendicularly to the axis 311 is wrapped about the half of the outer peripheral surface of the steering wheel 1.

Then, the pair of clamp rods 320 and 321 are opened, and the steering wheel 1 is revered on the annular table 310 and the table blocks 309. Subsequently, the pair of clamp rods 320 and 321 are closed, and the above-described operation is repeated. Thus, the lower half of the cover material 100 below the horizontal center line thereof is wrapped about the remaining half of the outer peripheral surface of the steering wheel 1. In this manner, the entire steering wheel 1 is covered with the cover material 100.

Third Embodiment

Referring to FIGS. 20 through 32, there is shown an apparatus 400 for automatically wrapping the cover material 100 about the steering wheel 1, according to a third embodiment of the invention.

Figure 23:
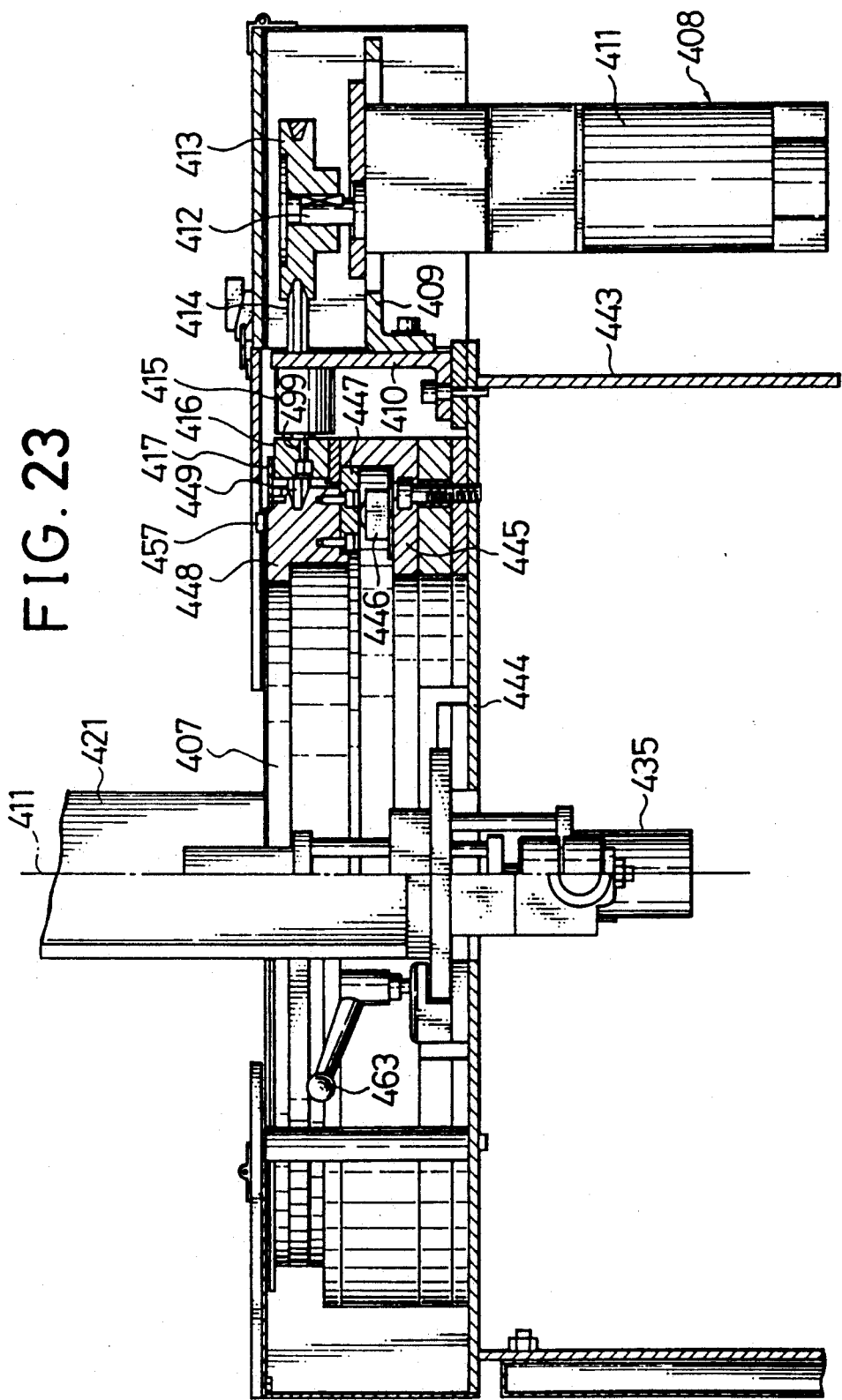
FIG. 23 is a partially cross-sectional side elevational view of the mechanism illustrated in FIG. 22.

A table 407 can be moved angularly about an axis 411 while supporting a steering-wheel setting jig to be described subsequently. As shown in FIG. 23, the table 407 is arranged as follows. That is, a head 445 having an L-shaped cross-sectional configuration and which is formed into an annular configuration is fixedly mounted on an upper surface of an upper frame 444 of a control box 443. An appropriate number of ball bearings 446 are fixedly mounted on the interior of the head 445 in appropriately spaced relation to each other peripherally. A guide plate 447 having a diameter inscribing the head 445 is rotatably supported by the ball bearings 446. A table body 448 formed into an annular configuration is fixedly mounted on the guide plate 447. A belt pulley 449 is formed in an outer peripheral surface of the table body 448.

Figure 30:
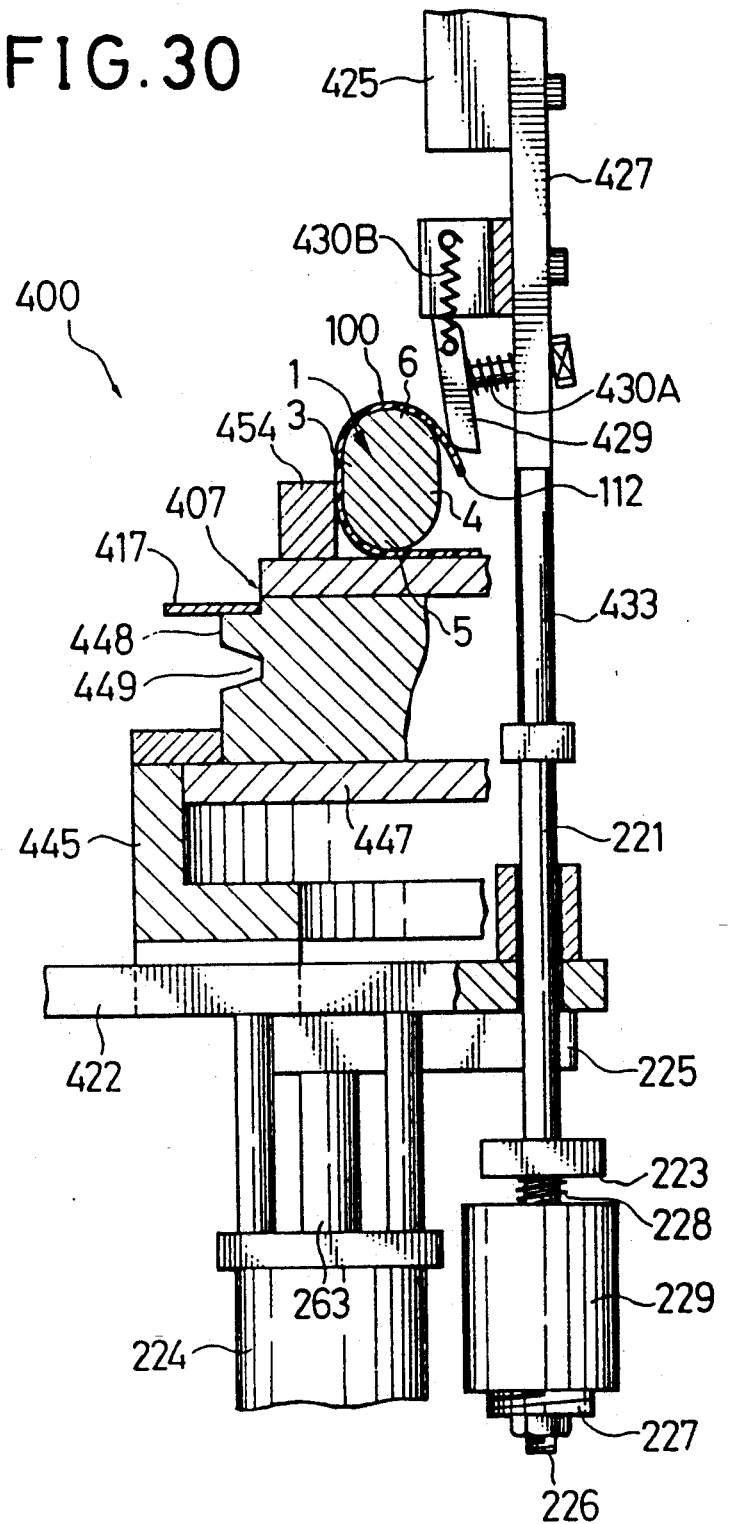
FIG. 30 is a fragmentary cross-sectional view of the wiper illustrated in FIG. 28, showing a conditional in which an upper side skirt of the cover material is wrapped up in an inner peripheral section of the steering wheel.

As shown in FIG. 30, a steering-wheel setting jig 454 receives the steering wheel 1 under such a condition that the steering wheel 1 is covered with the cover material 100 by an area from the outer peripheral section 3 to both the side sections 5 and 6 of the steering wheel 1.

Figure 26:
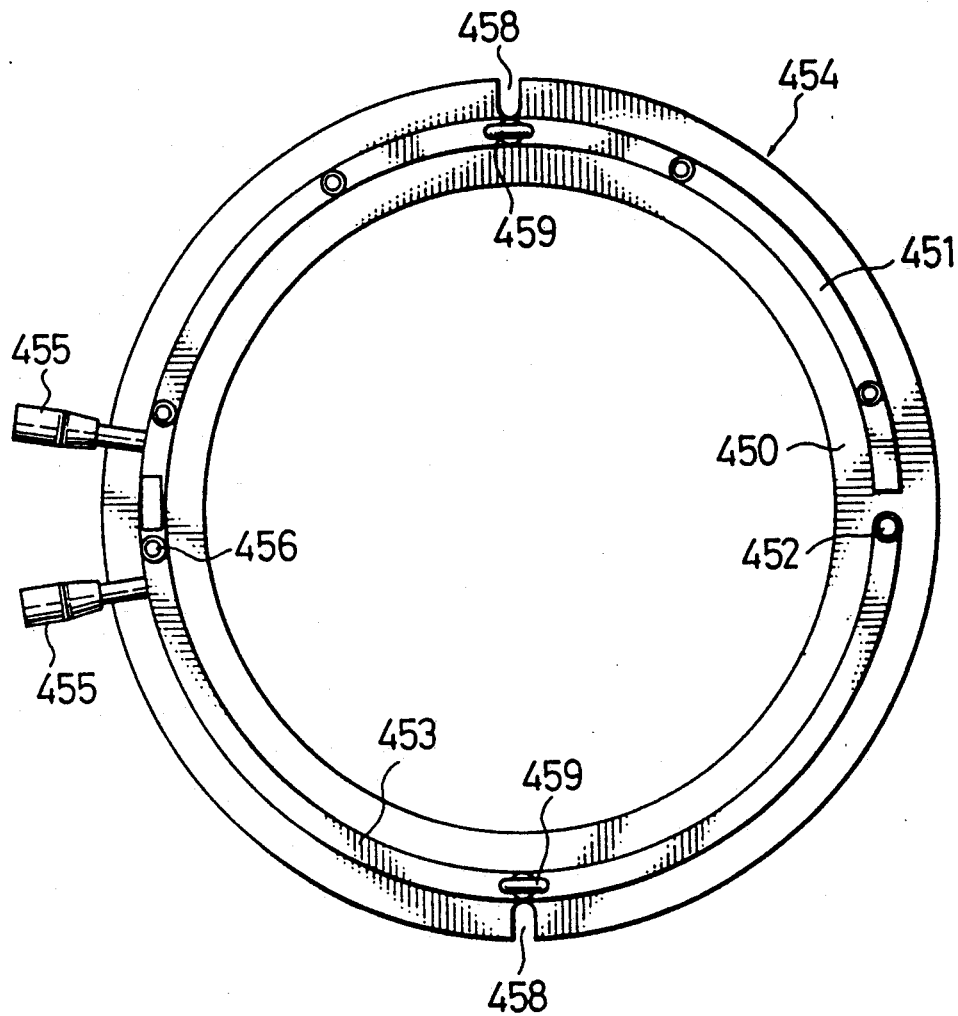
FIG. 26 is a top plan view of a setting jig illustrated in FIG. 20.
Figure 27:
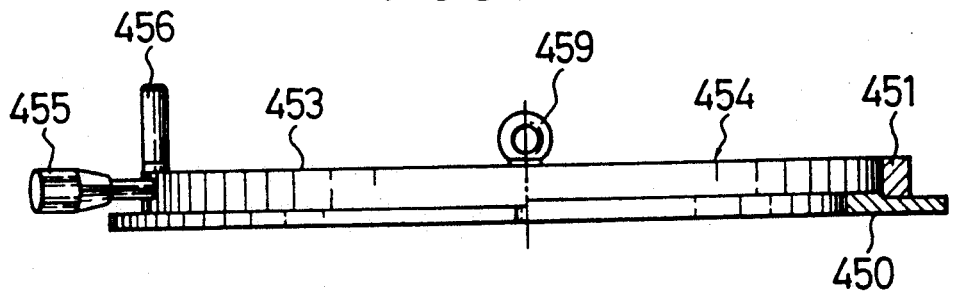
FIG. 27 is a partially cross-sectional side elevational view of the setting jig illustrated in FIG. 26.

As shown in FIGS. 26 and 27, the steering-wheel setting jig 454 is arranged as follows. That is, a semicircular stationary or fixed ring 451 is provided on a half peripheral portion of the upper surface of a base 450 formed into an annular configuration so as to be detachably mounted on an upper surface of the table body 448 (refer to FIG. 23). A semicircular openable ring 453 is provided on the remaining half peripheral portion of the upper surface of the base 450. The openable ring 453 has one end thereof which is pivotally mounted on the base 450 by a pin 452 at a location adjacent to one end of the stationary ring 451. The other end of the openable ring 453 is movable toward and away from the other end of the stationary ring 451 about the pin 452. Grip levers 455 and 455 are provided respectively on the other ends of the respective stationary and openable rings 451 and 453. A pin 456 is provided on the other end of the openable ring 453 for latching the other end of the openable ring 453 to the other end of the stationary ring 451 under such a condition that the other end of the openable ring 453 is joined to the other end of the fixed ring 451. A pair of engaging grooves 458 and 458 are provided at their respective positions opposed to each other diametrically of the base 450, and a pair of positioning pins 457 and 457 (refer to FIG. 23) can be engaged respectively with the pair of engaging grooves 458 and 458. A pair of handle elements 459 and 459 such as an eyebolt are fixedly mounted respectively on the stationary and openable rings 451 and 453 adjacent respectively to the pair of engaging grooves 458 and 458.

A drive mechanism 408 is provided which rotatively drives the setting jig 454 under such a condition that the setting jig 454 is mounted on the control box 443. The drive mechanism 408 is arranged as follows. That is, a motor bracket 409 and a cylinder bracket 410 are fixedly mounted on the upper frame 444 on the side of the gear surface of the control box 443. A clutch brake motor 411 is mounted on the motor bracket 409. The clutch brake motor 411 has an output rotary shaft 412 on which a drive pulley 413 opposed to the belt pulley 449 is fixedly mounted. A belt 414 is passed between and wound about both the pulleys 413 and 449. A piston/cylinder assembly 415 is mounted on the cylinder bracket 410. A brake shoe 416 is fixedly mounted on a piston 499 of the piston/cylinder assembly 415 such that the brake shoe 416 is urged against the outer peripheral surface of the table body 448 upon extension of the piston 449 to halt angular movement of the table body 448.

Figure 22:
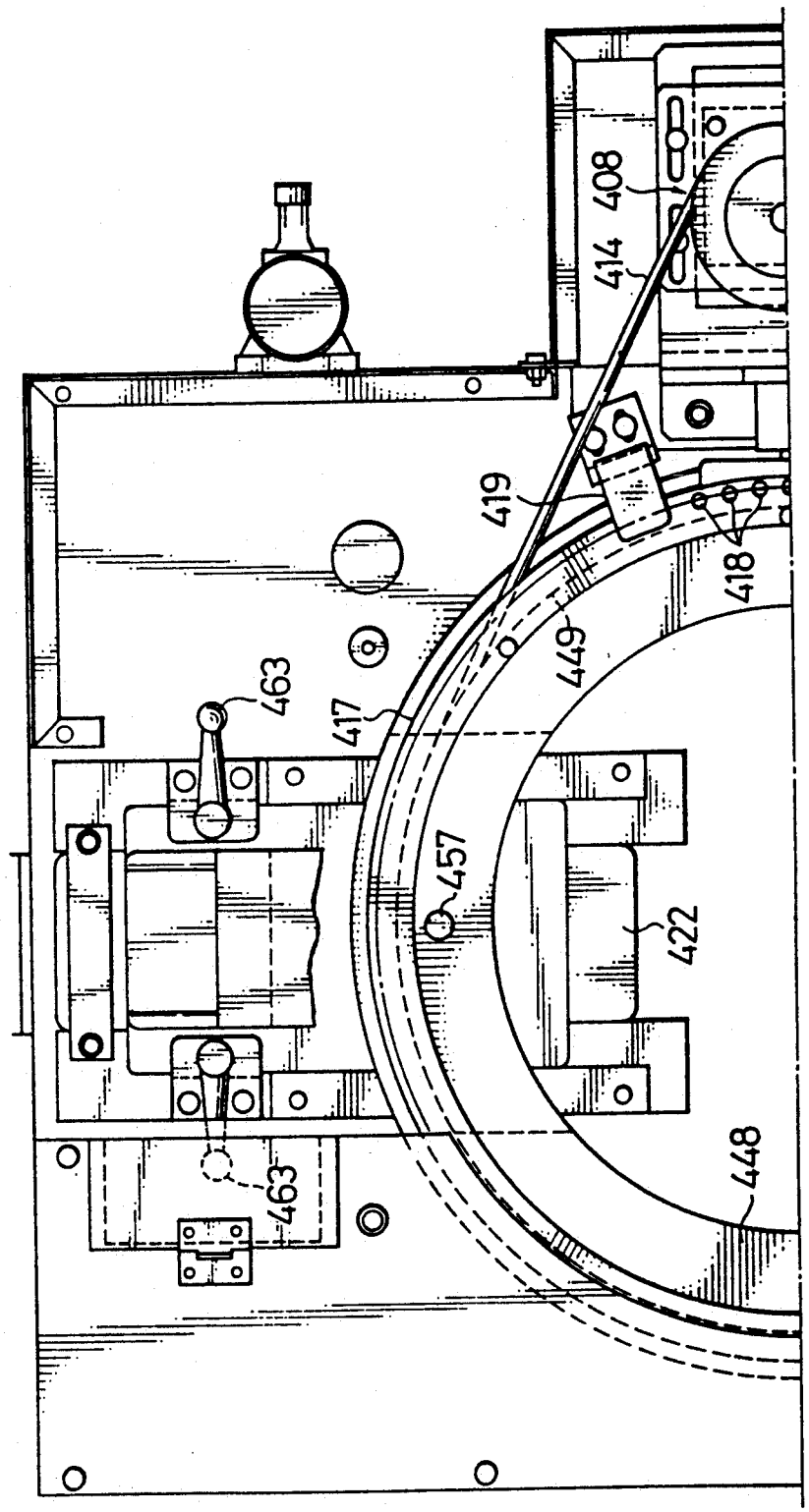
FIG. 22 is a fragmentary top plan view of a rotary drive mechanism of a steering-wheel support table illustrated in FIGS. 20 and 21.
Figure 24:
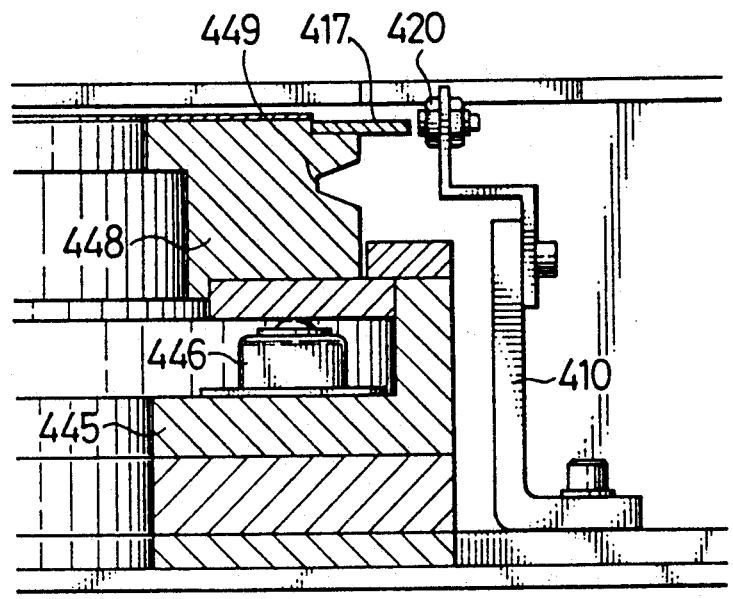
FIG. 24 is a fragmentary cross-sectional view of a portion of the mechanism illustrated in FIG. 23, on which an original-position detecting sensor is mounted.
Figure 25:
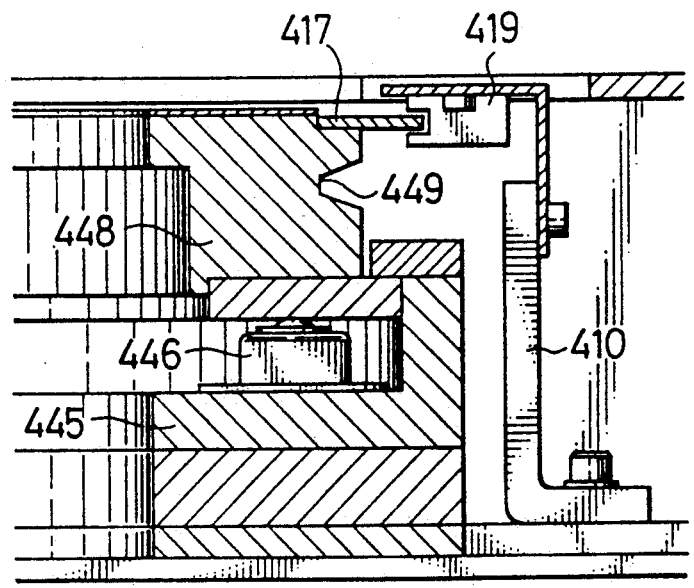
FIG. 25 is a fragmentary cross-sectional view of a portion of the mechanism illustrated in FIG. 23, on which an indexing sensor is mounted.

As shown in FIG. 23, a disc 417 is fixedly mounted on the table body 448 and extends radially outwardly therefrom. As shown in FIG. 22, a plurality of through bores 418 are formed through the disc 417 and are spaced from each other by an angular spacing of four (4) degrees. As shown in FIG. 24, a sensor 420 is mounted on an appropriate location of the cylinder bracket 410, for example, at a location adjacent to the motor bracket 409, for detecting an original position of angular movement of the table 407. As shown in FIG. 25, an indexing sensor 419 such as a photosensor is also mounted on an appropriate location of the cylinder bracket 410, for detecting a rotational angle of the table 407 in response to a light passing through the through bores 418. Referring back to FIG. 20, a pair of wrapping units 421 and 421 are mounted on the upper frame 444 of the control box 443 respectively at locations adjacent to both left- and right-hand sides of the table 407. Each of the pair of wrapping units 421 and 421 is arranged as follows. That is, an upstanding frame 423 is fixedly mounted on a slide base 422 which is supported for sliding movement along a line which passes through a center of the table 407. A fine lock piston/cylinder assembly 426 is mounted on the upper portion of the frame 423. The piston/cylinder assembly 426 has a piston 497 which is movable vertically along a vertical line which passes through a location adjacent to the inner peripheral section 4 of the steering wheel 1 set in the setting jig 454. A slide plate 425, which is so supported as be slidable vertically on a guide 424, is connected to the piston 497 of the piston/cylinder assembly 426. A wiper holder 427 is fixedly mounted on the slide plate 425. A wiper 429 is connected to the wiper holder 427 through a compression spring 430A and a tension spring 430B (refer to FIG. 28), for wrapping up the upper side skirt 112 of the cover material 100 extending radially inwardly from the upper side section 6 of the steering wheel 1, into the inner peripheral section 4 of the steering wheel 1, at downward movement of the wiper holder 427. The wiper 429 is so formed as to have a curved surface following the annular configuration of the inner peripheral section 4 of the steering wheel 1.

Figure 20:
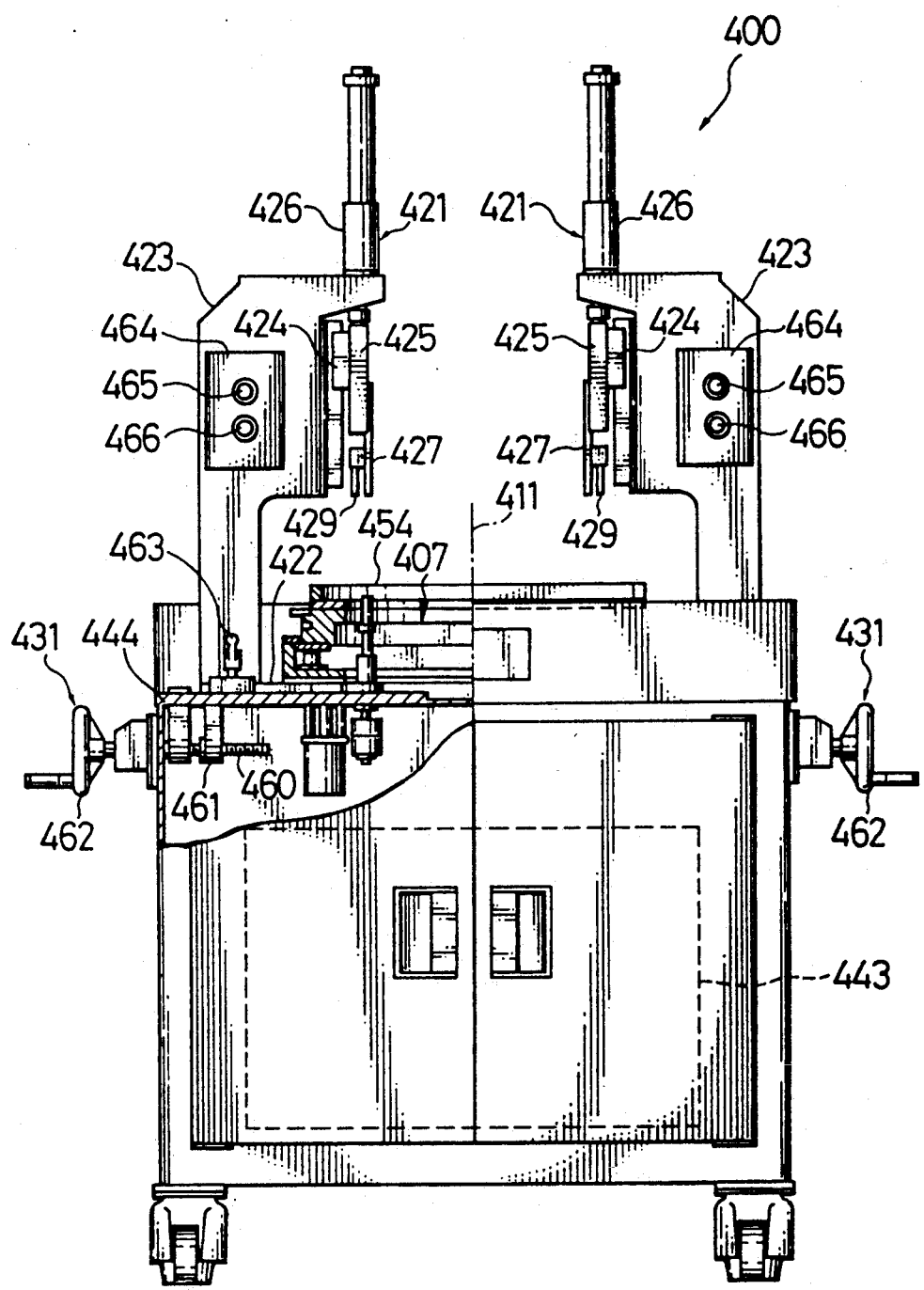
FIG. 20 is a partially cut-away front elevational view of an automatic wrapping apparatus for a steering wheel, according to a third embodiment of the invention.
Figure 21:
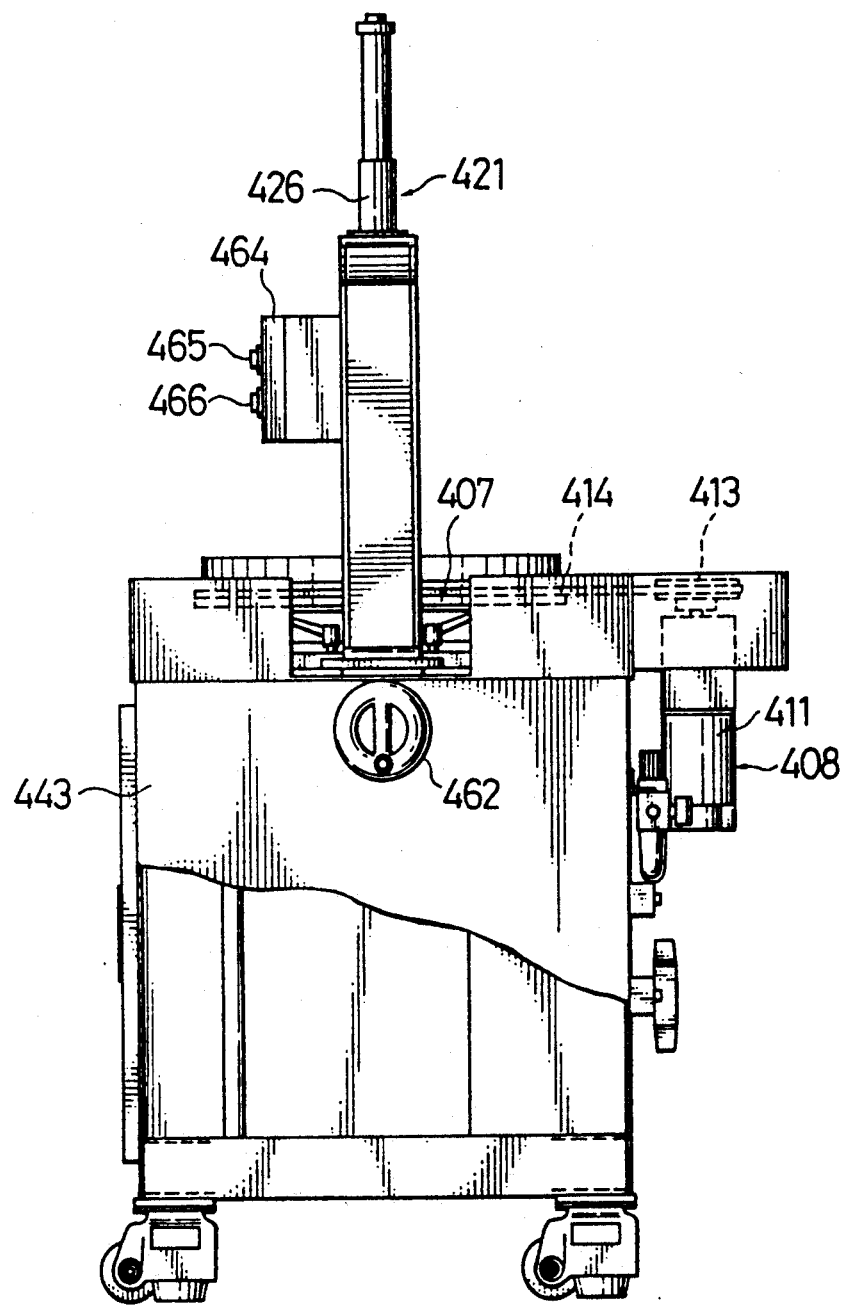
FIG. 21 is a partially cut-away side elevational view of the automatic wrapping apparatus illustrated in FIG. 20.

As shown in FIG. 20, a pair of adjusting mechanisms 431 and 431 are provided which adjust positions of the respective wipers 429 and 429 of the wrapping units 421 and 421 in accordance with the inner diametrical dimension of the steering wheel 1. Each of the pair of adjusting mechanisms 431 and 431 is arranged as follows. That is, a ball screw 460 is mounted at a location below the slide base 422 in a direction of sliding of the slide base 422. The ball screw 460 is threadedly engaged with a ball-screw-nut attaching block 461 which is connected to the slide base 422 nd which extends downwardly. A handle wheel 462 is attached to a rearward end of the ball screw 460. A clamp lever 463 is mounted on a location adjacent to the after base 422, for fixing the slide base 422 immediately after adjustment in position of the wrapping unit 421 such that the wiper 429 is located above the inner peripheral section 4 of the steering wheel 1.

Figure 28:
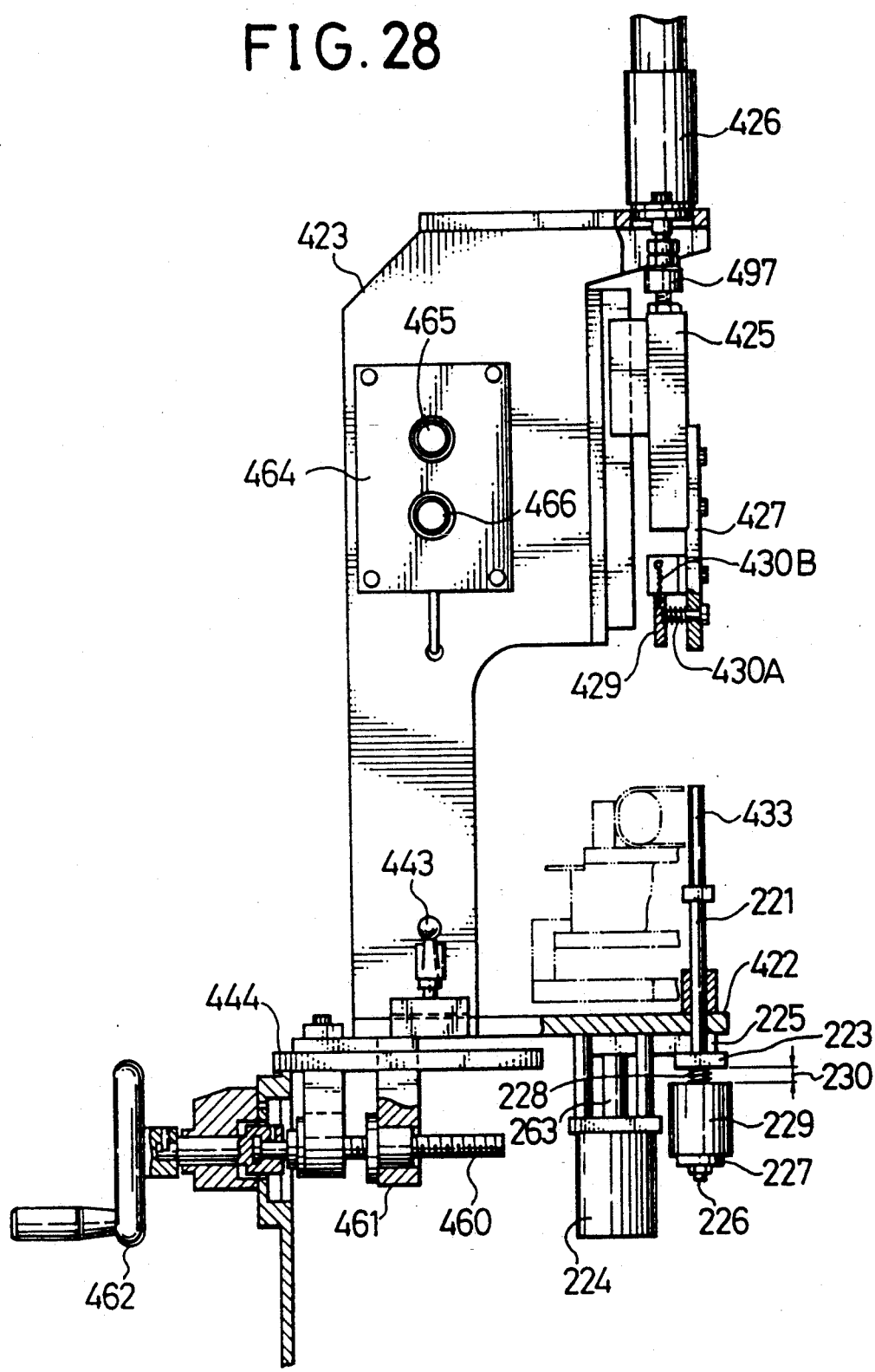
FIG. 28 is a fragmentary cross-sectional view of an arrangement including a pincher, a wiper, a pincher receiver or the like, showing a condition immediately before initiation of operation in which the cover material is wrapped about the steering wheel.
Figure 29:
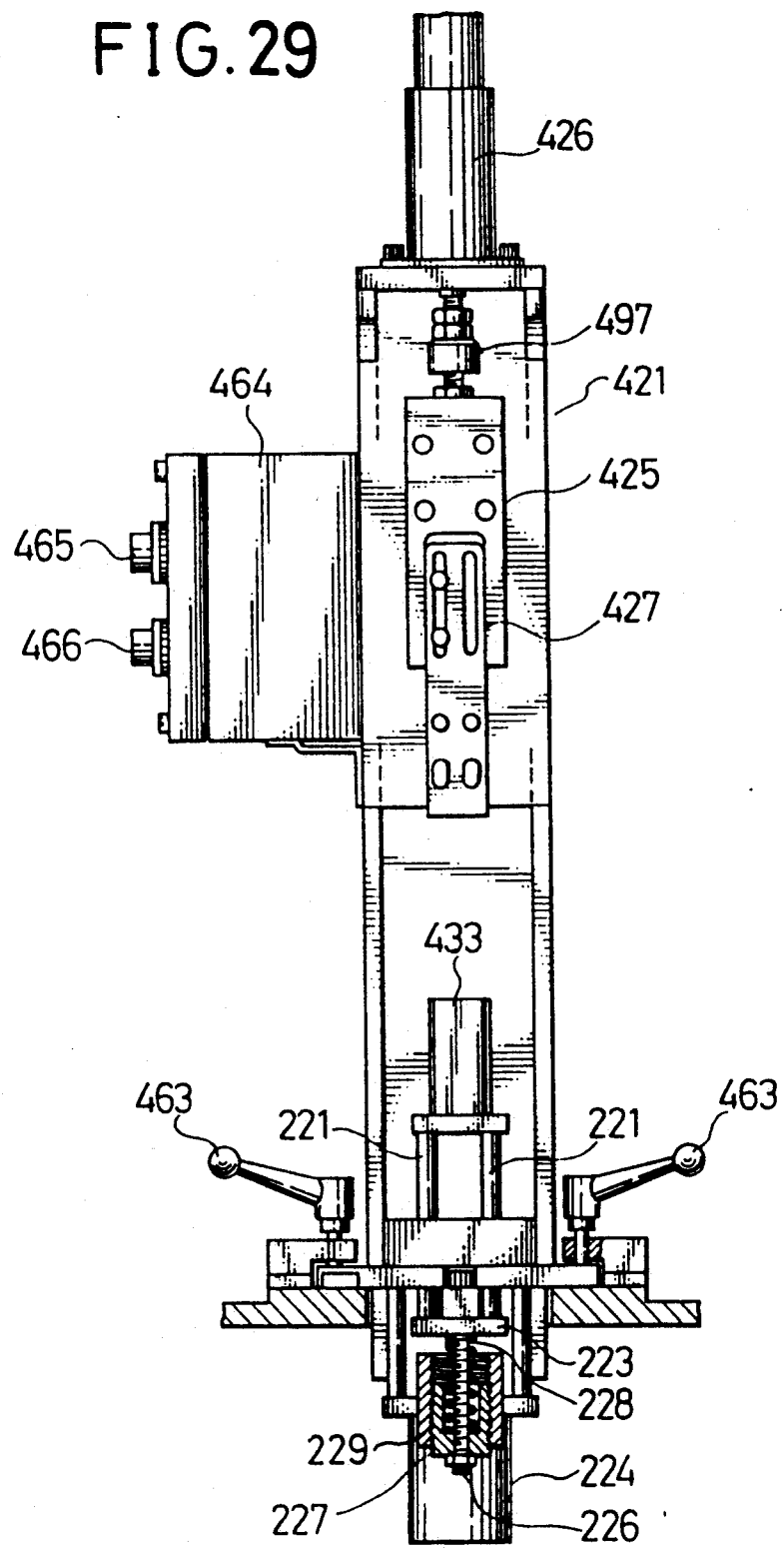
FIG. 29 is a partially cross-sectional, fragmentary right-hand side elevational view of the arrangement illustrated in FIG. 28.

As shown in FIG. 28, a stopper plate 433 is fixedly mounted on the upper ends of the respective slide shafts 221 and 221, for receiving the wiper holder 427. The stopper plate 433 is so formed as to have an annular surface following the annular configuration of the inner peripheral section 4 of the steering wheel 1.

A switch box 464 fixedly mounted on the frame 423 includes a start switch 465 and an emergency stop switch 466.

Figure 35:
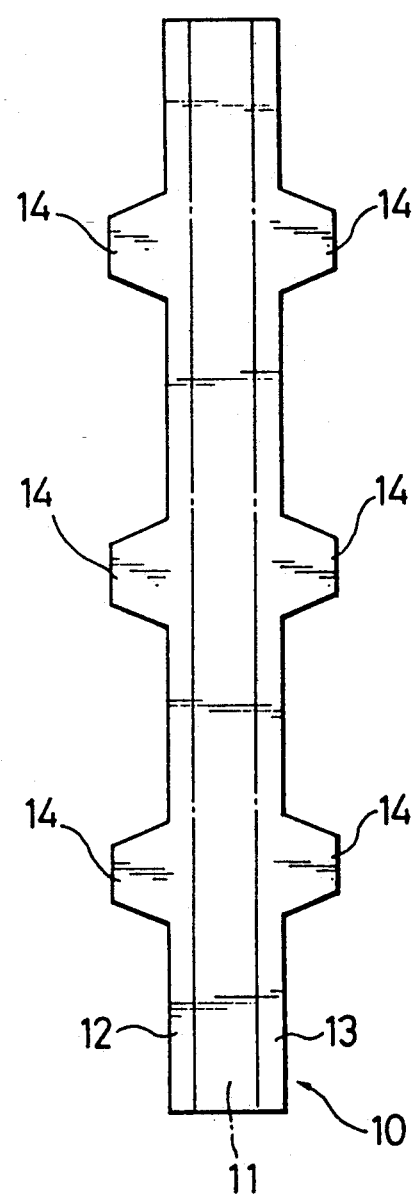
FIG. 35 is a developed view of a conventional cover material.
Figure 36:
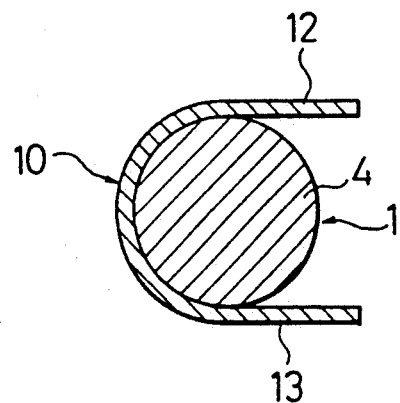
FIG. 36 is a fragmentary cross-sectional view for explanation of a conventional wrapping method for the steering wheel, the steering wheel being covered with the cover material.
Figure 38:
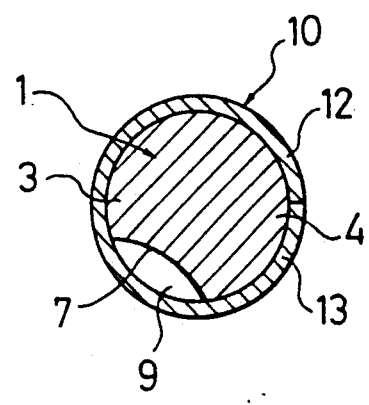
FIG. 38 is a fragmentary cross-sectional view showing a condition in which a gap occurs between the cover material illustrated in FIG. 37 and each of finger-applying recesses formed in the steering wheel.
Figure 37:
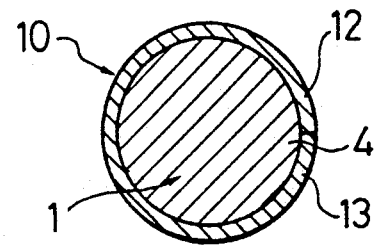
FIG. 37 is a fragmentary cross-sectional view of a condition in which the cover material illustrated in FIG. 36 is wrapped about the steering wheel.

In operation, lugs of a cover material like the lugs 14 of the cover material 10 illustrated in FIG. 35 and described previously are provisionally fastened respectively to the spokes 8 of the steering wheel 1. The openable ring 453 of the setting jig 454 is moved away from the fixed ring 451, and the steering wheel 1 is mounted on the base 450. Subsequently, the openable ring 453 is moved toward the fixed ring 451 to clamp the cover material 100 to the outer peripheral section of the steering wheel 1. Both side edges of the cover material except for the lugs thereof may be provisionally fastened to the inner peripheral section 4 of the steering wheel 1.

The setting jig 454, on which the steering wheel 1 and the cover material 100 are set in this manner, is mounted on the table body 448 of the table 407 which stands ready at an original position of angular movement of the table 407. The engaging grooves 458 and 458 are engaged respectively with the pins 457 and 457. Thus, the setting jig 454 is positioned. Subsequently, the wheels 462 are operated to adjust the positions of the respective wrapping units 421 and 421 in accordance with the length of the inner peripheral section 4 of the steering wheel 1. The wrapping units 421 and 421 are fixed to the adjusted position by their respective clamp levers 463 and 463.

Under this condition, operation is made to turn on the start switch 465 of the switch box 464. Then, the pistons 497 and 497 of the respective piston/cylinder assemblies 426 and 426 are so operated as to move the slide plates 425 downwardly for the wrapping units 421 and 421. By doing so, as shown in FIG. 30, the wiper holder 427 of each of the wrapping units 421 and 421 is moved downwardly to press down the stopper plate 433 against the biasing force of the coil spring 228. Simultaneously, the wiper 429 is moved downwardly at a location slightly approaching the inner peripheral section 4 of the steering wheel 1 from the upper side section 6 thereof. The wiper 429 urges the upper side skirt 112 of the cover material 100 against the steering wheel 1 while being inclined against the biasing forces of the respective springs 430A and 430B and while stretching the upper side skirt 112. In this manner, the cover material 100 is adhered to a portion of the steering wheel 1 from the outer peripheral section 3 toward the upper side section 6. At this time, the piston/cylinder assembly 426 is locked so that operation of the downward movement of the piston 497 is halted.

Figure 31:
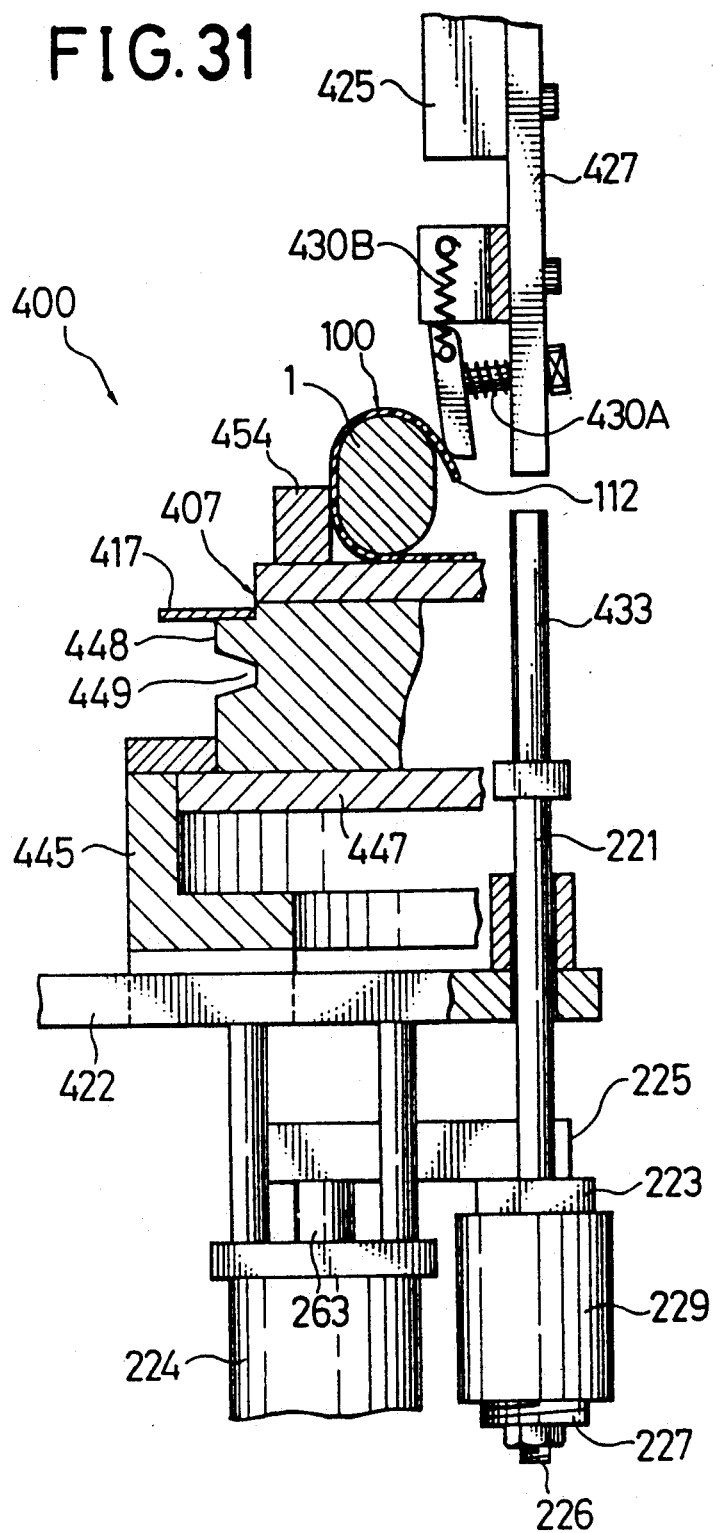
FIG. 31 is a view similar to FIG. 30, but showing a condition in which a pressing-down plate is moved downwardly.

Immediately thereafter, the piston/cylinder assembly 224 is so operated that the piston 263 moves the pressing-down plate 225 downwardly. By doing so, as shown in FIG. 31, the pressing-down plate 225 presses down the spring-receiving plate 223. Morement of the spring-receiving plate 223 is transmitted to the stopper plate 433 through the slide shafts 221 and 221. Thus, the stopper plate 433 is moved downwardly. At the point of time the spring-receiving plate 223 is abutted against the stopper nut 229, the above-described movement of the piston 263 of the piston/cylinder assembly 224 is halted.

Figure 32:
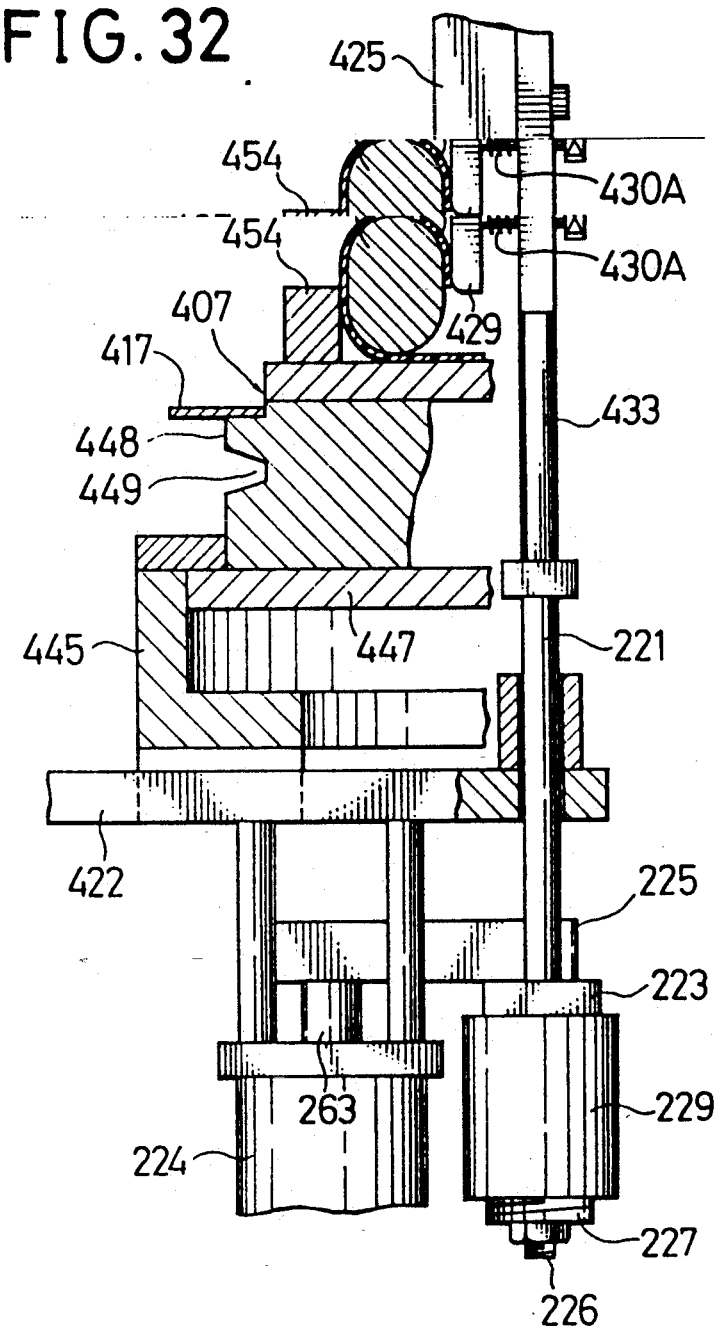
FIG. 32 is a view similar to FIG. 30, but showing a condition in which the upper side skirt of the cover material is urged against the inner peripheral section of the steering wheel by the wiper.

Immediately thereafter, the piston 497 of the piston/cylinder assembly 426 is so operated as to further move the slide plate 425 downwardly. By doing so, as shown in FIG. 32, the wiper 429 changes its orientation to the vertical direction further against the biasing forces of the respective springs 430A and 430B. The wiper 429 is moved downwardly while wrapping up the upper side skirt 112 of the cover material 100 into the inner peripheral section 4 of the steering wheel 1, so that the upper side skirt 112 of the cover material 100 is urged against and adhered to the inner peripheral section 4 of the steering wheel 1. At this time, the wiper holder 427 is received by the stopper plate 433, and the above-described operation of the piston/cylinder assembly 426 is halted. Immediately thereafter, the piston/cylinder assembly 426 is so operated that the piston 497 moves the slide plate 425 upwardly. The piston/cylinder assembly 224 is so operated that the piston 263 moves the pressing-down plate 225 upwardly. Thus, the wiper 429 is returned to the original position, and the pressing-down plate 225 is also returned to the original position. The slide shafts 221 and 221, the stopper plate 433 and the spring-receiver plate 223 are also returned to their respective original positions. At this time, the operation of each of the piston/cylinder assemblies 426 and 224 are halted.

By the above-described operation, wrapping of the cover material 100 about portions of the steering wheel 1, which correspond respectively to the wrapping units 421 and 421 and which extend from the outer peripheral section 3 of the steering wheel 1 to the inner peripheral section 4 thereof through the upper side section 6, has been completed.

Immediately thereafter, the clutch of the motor 411 is operated so that rotation is transmitted to the rotary shaft 412. The rotation is transmitted to the table body 448 through the drive pulley 413, the belt 414 and the belt pulley 449. The piston/cylinder assembly 415 is so operated that the piston 499 releases the brake shoe 416 from the outer peripheral surface of the table body 448. Thus, the table 407 is moved angularly about the axis 411. When the table 407 is moved angularly by a predetermined angle, for example, when the table 407 is moved angularly by one or more of the through bores 418, the indexing sensor 419 detects the light passing through the corresponding one of the through bores 418 formed in the disc 417, to issue the detecting signal. By the detecting signal, braking is applied to the motor 411 to cut off transmission of rotation to the output rotary shaft 412. The piston/cylinder assembly 415 is so operated that the piston 499 urges the brake plate 416 against the outer peripheral surface of the table body 448. Thus, the table 407 stops in angular movement about the axis 411 at the rotational-angle position. By the angular movement of the table 407, the aforesaid partially wrapped portions of the cover material 100 are angularly moved out of the wrapping units 421 and 521, respectively. Succeeding portions of the cover material 100 successively reach locations just below the wrapping units 421 and 421, respectively.

Immediately thereafter, each of the wrapping units 421 and 421 performs the above-described sequential operation. In the case where two of the spokes 8 of the steering wheel 1 reach locations just below the wrapping units 421 and 421, respectively, each of the wrapping units 421 and 421 halts the above-described sequential operation.

Such operation is repeated automatically. When the table 407 is moved angularly about the axis 411 by 180 degrees, operation of each of the wrapping units 421 and 421 is halted. Thus, the upper half of the cover material 100 above the horizontal center line thereof is wrapped about the half of the outer peripheral surface of the steering wheel 1.

Then, the openable ring 453 is pivoted away from the fixed rig 451. The steering wheel 1 is revered on the setting jig 454. Subsequently, the openable ring 453 is again moved toward the fixed ring 451. Under this condition, the above-described operation is automatically repeated. The table 407 is moved angularly through remaining 180 degrees and is returned to the original position. The sensor 420 detects returning of the table 407 to the original position, to issue a signal. In response to the signal, operation of each of the wrapping units 421 and 421 is halted. Thus, the lower half of the cover material 100 below the horizontal center line is wrapped about the remaining half of the outer peripheral surface of the steering wheel 1. In this manner, the entire steering wheel 1 is covered with the cover material 100.

Figure 33:
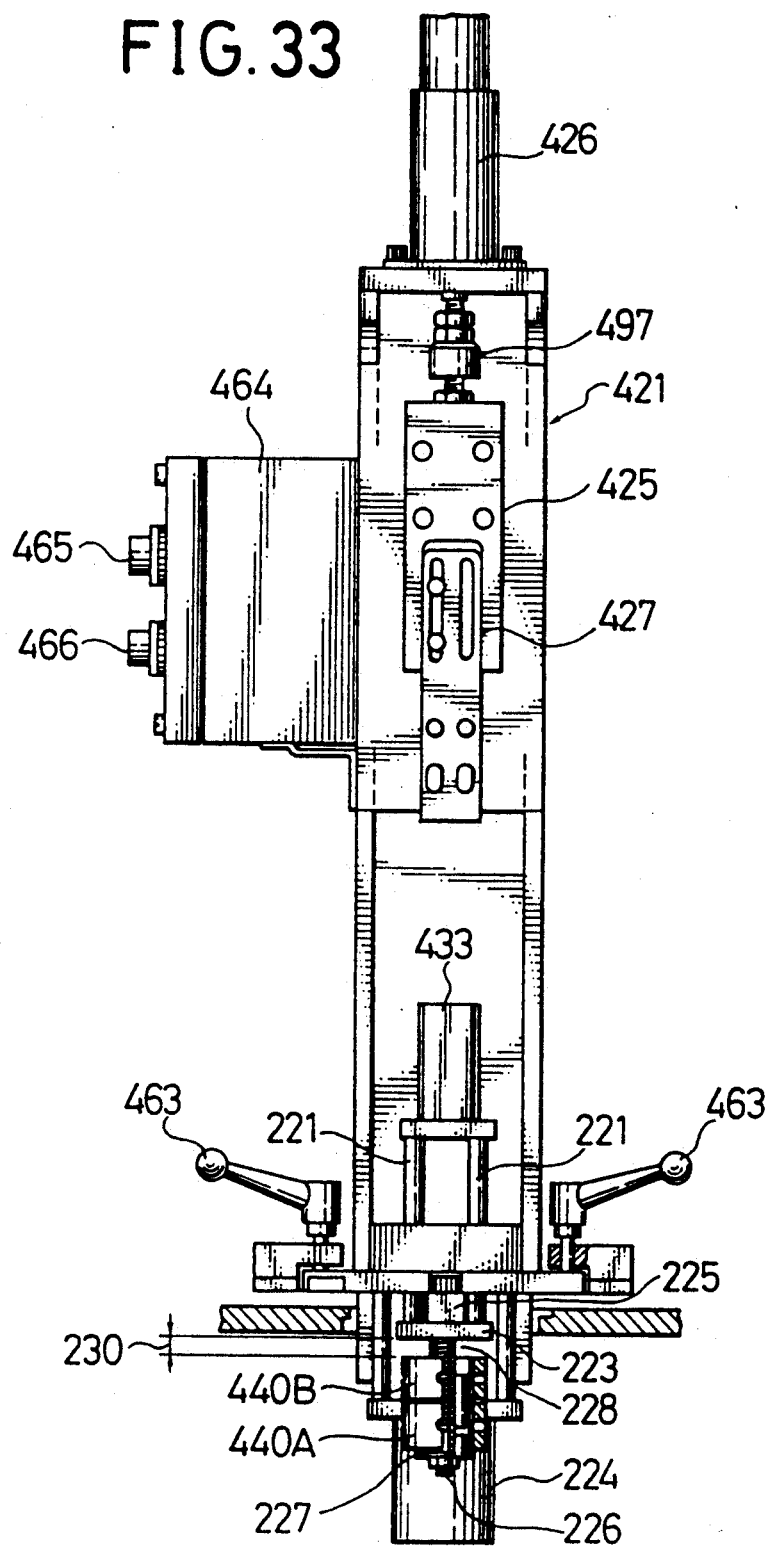
FIG. 33 is a view similar to FIG. 29, but showing a modification in which a pair of wrapping units are modified.

In the third embodiment described above, the arrangement may be such that three or more wrapping units 421 are mounted on the upper frame 444 along the base 450 of the table 407 and are spaced from each other through an appropriate angular spacing. The wrapping units 421 and 421 are synchronously operated, or are operated with a time lag. Further, the arrangement may be such that, in place of provision of the stopper nut 229, as shown in FIG. 33, a stopper nut 440A is threaded engaged with the outer peripheral surface of the lower portion of the spring-receiving element 227, the stopper nut 440A is pitch-moved vertically to adjust a biasing force of the coil spring 228, a spacing adjusting nut 440B is threadedly engaged with the outer peripheral surface of the upper portion of the spring-receiving element 227, and the spacing 230 between the spring-receiving plate 223 and the spacing adjusting nut 440B is adjusted.

What is claimed is:

1. An apparatus for automatically wrapping a cover material about a steering wheel of a vehicle, said steering wheel having an axis and having inner and outer peripheral sections in a first plane extending perpendicularly to said axis of said steering wheel, said steering wheel having a pair of side surfaces by which said inner and outer peripheral sections are connected to each other, said cover material having an annular strip body whose peripheral length in said first plane is substantially identical with that of the outer peripheral section of said steering wheel and a pair of said skirts extending radially inwardly respectively from both side edges of said annular strip body, said annular strip body and said pair of side skirts cooperating with each other to define therein an annular space into which said steering wheel can be fitted, said apparatus comprising:
   support means for supporting said steering wheel covered with said cover material, in said first plane;
   clamp means for clamping the annular strip body of said cover material to the outer peripheral section of said steering wheel supported by said support means; and
   wiper means for urging a portion of one of said pair of side skirts against the inner peripheral section of said steering wheel, said wiper means being movable in a substantially linear path which is substantially parallel to a portion of the inner peripheral section of the wheel.

2. An apparatus according to claim 1, further comprising receiver means movable in said second plane extending perpendicularly to said first plane for receiving one of said pair of side skirts, and pincher means movable in said second plane and cooperating with said receiver means to clamp therebetween the one side skirt, said pincher means being movable together with said receiver means to a position where the one side skirt is wrapped up in the inner peripheral section of said steering wheel.

3. An apparatus according to claim 1, wherein said first plane extends horizontally.

4. An apparatus according to claim 1, wherein said support means includes a plurality of support tables arranged in spaced relation to each other along a circle substantially identical with said steering wheel and arranged in said first plane.

5. An apparatus according to claim 4, wherein said support means further includes a plurality of positioning plates associated respectively with said support tables, said positioning plates being movable toward and away from said circle in accordance with a peripheral length of the outer peripheral section of said steering wheel.

6. An apparatus according to claim 1, wherein said clamp means includes a piston/cylinder assembly having a piston, and a presser mounted on a free end of said piston, wherein said piston is movable in said first plane toward and away from a circle substantially identical with said steering wheel and arranged in said first plane, and wherein, when said piston is moved toward said circle, said presser urges the annular strip body of said said cover material against the outer peripheral section of said steering wheel.

7. An apparatus for automatically wrapping a cover material about a steering wheel of a vehicle, said steering wheel having an axis and having inner and outer peripheral sections in a first plane extending perpendicularly to said axis of said steering wheel, said steering wheel having a pair of side surfaces by which said inner and outer peripheral sections are connected to each other, said cover material having an annular strip body whose peripheral length in said first plane is substantially identical with that of the outer peripheral section of said steering wheel and a pair of side skirts extending radially inwardly respectively from both side edges of said annular strip body, said annular strip body and said pair of side skirts cooperating with each other to define therein an annular space into which said steering wheel can be fitted, said apparatus comprising;
   support means for supporting said steering wheel covered with said cover material, in said first plane;
   clamp means for clamping the annular strip body of said cover material to the outer peripheral section of said steering wheel supported by said support means;
   wiper means for urging one of said pair of side skirts against the inner peripheral section of said steering wheel;
   receiver means movable in a second plane extending perpendicularly to said first plane for receiving one of said pair of side skirts:
   pincher means movable in said second plane and cooperating with said receiver means to clamp therebetween the one side skirt, said pincher means being movable together with said receiver means to a position where the one side skirt is wrapped up in the inner peripheral section of said steering wheel; and
   said pincher means including a pincher and a piston/cylinder assembly having a piston, said pincher being mounted on a free end of said piston, wherein said piston is movable along a line extending in parallel relation to said second plane toward and away from a circle substantially with said steering wheel and arranged in said first plane.

8. An apparatus for automatically wrapping a cover material about a steering wheel of a vehicle, said steering wheel having an axis and having inner and outer peripheral sections in a first plane extending perpendicularly to said axis of said steering wheel, said steering wheel having a pair of side surfaces by which said inner and outer peripheral sections are connected to each other, said cover material having an annular strip body whose peripheral length in said first plane is substantially identical with that of the outer peripheral section of said steering wheel and a pair of side skirts extending radially inwardly respectively from both sides edges of said annular strip body, said annular strip body and said pair of side skirts cooperating with each other to define therein an annular space into which said steering wheel can be fitted, and apparatus comprising:

support means for supporting said steering wheel covered with said cover material, in said first plane;

clamp means for clamping the annular strip body of said cover material to the other peripheral section of said steering wheel supported by said support means;

wiper means for urging one of said pair of side skirts against the inner peripheral section of said steering wheel;

receiver means movable in a second plane extending perpendicularly to said first plane for receiving one of said pair of side skirts;

pincher means movable in said second plane and cooperating with said receiver means to clamp therebetween the one side skirt, said pincher means being movable together with said receiver means to a position where the one side skirt is wrapped up in the inner peripheral section of said steering wheel; and spring means by which said wiper means is connected to said pincher means.

9. An apparatus for automatically wrapping a cover material about a steering wheel of a vehicle, said steering wheel having an axis and having inner and outer peripheral sections in a first plane extending perpendicularly to said axis of said steering wheel, said steering wheel having a pair of side surfaces by which said inner and outer peripheral sections are connected to each other, said cover material having an annular strip body whose peripheral length in said first plane is substantially identical with that of the outer peripheral section of said steering wheel and a pair of side skirts extending radially inwardly respectively from both sides edges of said annular strip body, said annular strip body and said pair of side skirts cooperating with each other to define therein an annular space into which said steering wheel can be fitted, said apparatus comprising:

support means for supporting said steering wheel covered with said cover material, in said first plane;

clamp means for clamping the annular strip body of said cover material to the outer peripheral section of said steering wheel supported by said support means;

wiper means for urging one of said pair of side skirts against the inner peripheral section of said steering wheel;

receiver means movable in a second plane extending perpendicularly to said first plane for receiving one of said pair of side skirts;

pincher means movable in said second plane and cooperating with said receiver means to clamp therebetween the one side skirt, said pincher means being movable together with said receiver means to a position where the one side skirt is wrapped up in the inner peripheral section of said steering wheel; and said pincher means and said wiper means being formed to have respective surfaces which are curved in accordance the with inner peripheral section of said steering wheel.

10. An apparatus for automatically wrapping a cover material about a steering wheel of a vehicle, said steering wheel having an axis and having inner and outer peripheral sections in a first plane extending perpendicularly to said axis of said steering wheel, said steering wheel having a pair of side surfaces by which said inner and outer peripheral sections are connected to each other, said cover material having an annular strip body whose peripheral length in said first plane is substantially identical with that of the outer peripheral section of said steering wheel and a pair of side skirts extending radially inwardly respectively from both sides edges of said annular strip body, said annular strip body and said pair of side skirts cooperating with each other to define therein an annular space into which said steering wheel can be fitted, said apparatus comprising:

support means for supporting said steering wheel covered with said cover material, in said first plane;

clamp means for clamping the annular strip body of said cover material to the outer peripheral section of said steering wheel supported by said support means;

wiper means for urging one of said pair of side skirts against the inner peripheral section of said steering wheel;

receiver means movable in a second plane extending perpendicularly to said first plane for receiving one of said pair of side skirts;

pincher means movable in said second plane and cooperating with said receiver means to clamp therebetween the one side skirt, said pincher means being movable together with said receiver means to a position where the one side skirt is wrapped up in the inner peripheral section of said steering wheel; and said receiver means formed to have a surface which is curved in accordance with the inner peripheral section of said steering wheel.

11. An apparatus according to claim 10, wherein said receiver means includes a piston/cylinder assembly having a piston, and a receiver plate connected to said piston of said piston/cylinder assembly and movable thereby toward and away from the one side skirt of said cover material.

12. An apparatus according to claim 11, wherein said receiver means includes spring means associated with said receiver plate for biasing the same against the one side surface of said one side skirt of said cover material.

13. An apparatus for automatically wrapping a cover material about a steering wheel of a vehicle, said steering wheel having an axis and having inner and outer peripheral sections in a first plane extending perpendicular to said axis of said steering wheel, said steering wheel having a pair of side surfaces by which said inner and outer peripheral sections are connected to each other, said cover material having an annular strip body whose peripheral length in said first plane is substantially identical with that of the outer peripheral section of said steering wheel and a pair of side skirts extending radially inwardly respectively from both side edges of said annular strip body, said annular strip body and said pair of side skirts cooperating with each other to define therein an annular space into which said steering wheel can be fitted, said apparatus comprising:

support means for supporting said steering wheel covered with said cover material, in said first plane;

clamp means for clamping the annular strip body of said cover material to the outer peripheral section of said steering wheel supported by said support means;

wiper means for urging one of said pair of side skirts against the inner peripheral section of said steering wheel; and drive means connected to said support means for rotatively driving the same in said first plane.

14. An apparatus according to claim 13, wherein said clamp means clamps said cover material to said steering wheel along the entire outer peripheral section of said steering wheel.

15. An apparatus according to claim 13, wherein said support means includes a plurality of table blocks fixedly arranged in spaced relation to each other along a circle substantially identical with said steering wheel and arranged in said first plane, an annular table supported by said table blocks for angular movement about said axis, said annular table having a peripheral surface on which driven gear teeth are formed, and wherein said drive means includes a motor having an output shaft, and a pinion gear mounted on said output shaft for rotation therwith and in mesh with said driven gear teeth.

16. An apparatus according to claim 15, further including a plurality of guide rollers arranged in spaced relation to each other along said circle and in contact with the outer peripheral surface of said annular table.

17. An apparatus according to claim 16, wherein said guide rollers are arranged respectively on said table blocks.

18. An apparatus according to claim 18, wherein said clamp means includes a pair of semicircular clamp rods arranged in said first plane, said pair of semicircular clamp rods cooperating with each other to define said circle, said pair of semicircular clamp rods having their respective one ends which are connected to said annular table and the respective other ends which are movable toward and away from each other.

19. An apparatus for automatically wrapping a cover material about a steering wheel of a vehicle, said steering wheel having an axis and having inner and outer peripheral sections in a first plane extending perpendicularly to said axis of said steering wheel, said steering wheel having a pair of side surfaces by which said inner and outer peripheral sections are connected to each other, said cover material having an annular strip body whose peripheral length in said first plane is substantially identical with that of the outer peripheral section of said steering wheel and a pair of side skirts extending radially inwardly respectively from both side edges of said annular strip body, said annular strip body and said pair of side skirts cooperating with each other to define therein an annular space into which said steering wheel can be fitted, said apparatus comprising:

support means for supporting said steering wheel covered with said cover material, in said first plane;

clamp means for clamping the annular strip body of said cover material to the outer peripheral section of said steering wheel supported by said support means;

wiper means for urging one of said pair of side skirts against the inner peripheral section of said steering wheel; and said support means and said clamp means cooperating with each other to form steering-wheel setting means for supporting said steering wheel covered with said cover material, in said first plane, and for clamping the annular strip body of said cover material to the outer peripheral section of said steering wheel, said steering-wheel setting means clamping said cover material to said steering wheel along the entire outer peripheral section of said steering wheel, said steering-wheel setting means being angularly movable about said axis of said steering wheel;

said apparatus further comprising drive means for rotatively driving said steering-wheel setting means about said axis of said steering wheel; and said wiper means including a plurality of wrapping units capable of being moved to a position whereon of the pair of side skirts of said cover material is wrapped up to the inner peripheral section of said steering wheel and the capable of being moved to a position where the one side skirt of said cover material is urged against the inner peripheral section of said steering wheel, said wrapping units being arranged along a circle substantially identical with said steering wheel and being arranged in said first plane in spaced relation to each other.

20. An apparatus according to claim 19, further comprising adjusting means for adjusting positions of the respective wrapping units with respect to said circle in accordance with a length of the inner peripheral section of said steering wheel.

21. An apparatus according to claim 19, wherein said steering-wheel setting means includes a table and setting means for setting said steering wheel under such a condition that the cover material is clamped to the outer peripheral section of said steering wheel, the last-mentioned setting means being capable of being detachably mounted on said table.

22. An apparatus according to claim 19, further including means for provisionally fastening said cover material to said steering wheel.

23. An apparatus according to claim 19, wherein said steering wheel has a plurality of spokes generally extending radially inwardly from the inner peripheral section of said steering wheel toward said axis thereof, and wherein each of said pair of side skirts has a plurality of lugs extending radially inwardly from the radially inward edge of the side skirt, for being wrapped respectively about said spokes of said steering wheel.

24. An apparatus to according to claim 21, wherein said table has a peripheral surface in which a groove is formed, and wherein said drive means includes a motor having an output shaft, a belt pulley fixedly mounted on said output shaft, and a belt running about said groove in the outer peripheral surface of said table and said belt pulley.

25. An apparatus according to claim 19, wherein said steering-wheel setting means includes a stationary semicircular ring and a movable semicircular ring having one end thereof pivotally mounted to said table and the other end movable toward and away from said stationary semicircular ring.

26. An apparatus according to claim 21, further including brake means for braking said table so as to halt rotation thereof.

27. An apparatus according to claim 26, wherein said brake means includes a brake shoe which is capable of being urged against an outer peripheral surface of said table to halt angular movement thereof.

28. An apparatus according to claim 21, further including a disc extending radially outwardly from said table, said disc having formed therein a plurality of through bores spaced from each other by a predetermined distance.

29. An apparatus according to claim 28, further including a sensor for detecting an original angular-movement position of said table.

30. An apparatus according to claim 28, further including an indexing sensor for detecting an angular position of said table on the basis of a light passing through said through bores.

31. An apparatus according to claim 19, wherein each of said wrapping units includes compression and tension spring means for biasing the one side skirt against the inner peripheral section of the steering wheel.

* * * * *

UNITED STATES PATENT AND TRADEMARK OFFICE
CERTIFICATE OF CORRECTION

PATENT NO. : 5,240,547
DATED : August 31, 1993
INVENTOR(S) : Toshio Itagaki

It is certified that error appears in the above-indentified patent and that said Letters Patent is hereby corrected as shown below:

| | |
|---|---|
| Column 1 | Line 33, change "ore" to --more--; |
| Column 1 | Line 67, change "in" to --is--; |
| Column 2 | Line 6, delete second "the"; |
| Column 2 | Line 61, change "supporting", first occurrence, to --support--. |
| Column 3 | Line 44, change "wheel." to --wheel,--; |
| Column 5 | Line 61, change "can" to --an--; |
| Column 6 | Line 34, change "conditional" to --condition--; |
| Column 7 | Line 1, change "through" to --throughout--; |
| Column 9 | Line 14, change "228" to --226--; |
| Column 11 | Line 18, change "edges" to --edge--; |
| Column 14 | Line 40, change "half" to --halt--; |
| Column 15 | Line 54, change "gear" to --rear--; |
| Column 15 | Line 65, change "449" to --499--; |

UNITED STATES PATENT AND TRADEMARK OFFICE
CERTIFICATE OF CORRECTION

PATENT NO. : 5,240,547
DATED : August 31, 1993
INVENTOR(S) : Toshio Itagaki

Page 2 of 3

It is certified that error appears in the above-indentified patent and that said Letters Patent is hereby corrected as shown below:

| | |
|---|---|
| Column 16 | Line 52, change "nd" to --and--; |
| Column 16 | Line 55, change "after" to --slide--; |
| Column 17 | Line 52, change "Morement" to --Movement--; |
| Column 18 | Line 47, change "521" to --421--; |
| Column 18 | Line 66, change "rig" to --ring--; |
| Column 19 | Line 43, change "said", second occurrence, to --side--; |
| Column 21 | Line 16, change "and" to --said--; |
| Column 21 | Line 20, change "other" to --outer--; |
| Column 22 | Line 7, change "the with" to --with the--; |
| Column 22 | Lines 60--61, change "perpendicular" to --perpendicularly--; |
| Column 23 | Line 30, change "therwith" to --therewith--; |

UNITED STATES PATENT AND TRADEMARK OFFICE
CERTIFICATE OF CORRECTION

PATENT NO. : 5,240,547
DATED : August 31, 1993
INVENTOR(S) : Toshio Itagaki

It is certified that error appears in the above-indentified patent and that said Letters Patent is hereby corrected as shown below:

Column 23        Line 39, change "18" to --15--;

Column 24        Line 20, change "whereon" to --where one--;

Column 24        Line 23, change "the" to --then--.

Signed and Sealed this

Twenty-first Day of June, 1994

Attest:

BRUCE LEHMAN

*Attesting Officer*        *Commissioner of Patents and Trademarks*